(12) United States Patent
Patni et al.

(10) Patent No.: US 11,526,855 B2
(45) Date of Patent: Dec. 13, 2022

(54) METHOD AND SYSTEM FOR TRANSLATING TRANSACTION MESSAGES

(71) Applicant: Mastercard International Incorporated, Purchase, NY (US)

(72) Inventors: Gaurav K Patni, Pune (IN); Ketan Shrikant Joshi, Pune (IN); Rishabh Sisodia, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 65 days.

(21) Appl. No.: 16/668,226

(22) Filed: Oct. 30, 2019

(65) Prior Publication Data

US 2020/0143341 A1 May 7, 2020

(30) Foreign Application Priority Data

Nov. 5, 2018 (SG) .............................. 10201809808U

(51) Int. Cl.
*G06Q 20/08* (2012.01)
*G06Q 20/16* (2012.01)

(52) U.S. Cl.
CPC ......... *G06Q 20/0855* (2013.01); *G06Q 20/16* (2013.01)

(58) Field of Classification Search
None
See application file for complete search history.

(56) References Cited

U.S. PATENT DOCUMENTS 5,671,279 A * 9/1997 Elgamal .............. H04L 63/0428
705/75
6,039,245 A * 3/2000 Symonds .............. G06Q 20/202
235/379

(Continued)

OTHER PUBLICATIONS

Mastercard, Transaction Processing Rules, Dec. 14, 2021, Mastercard, all (https://www.mastercard.us/content/dam/mccom/global/documents/transaction-processing-rules.pdf) (Year: 2021).*

*Primary Examiner* — Paul S Schwarzenberg
(74) *Attorney, Agent, or Firm* — Buckley, Maschoff & Talwalker LLC

(57) ABSTRACT

A method for translating transaction messages includes receiving, by a server from an acquirer, an inbound transaction message that is associated with a transaction and pursuant to a first message format supported by the acquirer. The server translates the inbound transaction message from the first message format to a second message format supported by the server when the first and second message formats are different. The server processes the inbound transaction message having the second message format and generates an outbound transaction message having the second message format. The server translates the outbound transaction message from the second message format to a third message format supported by an issuer that corresponds to the transaction when the second and third message formats are different, and transmits the translated outbound transaction to the issuer for processing the transaction. Thus, the method allows the server to translate transaction messages between different message formats.

20 Claims, 15 Drawing Sheets

(56) References Cited

U.S. PATENT DOCUMENTS

| | | | |
|---|---|---|---|
| 2004/0128243 A1* | 7/2004 | Kavanagh | G06Q 20/403 |
| | | | 705/39 |
| 2007/0282743 A1* | 12/2007 | Lovelett | G06Q 20/10 |
| | | | 705/40 |
| 2010/0100480 A1* | 4/2010 | Altman | G06Q 30/04 |
| | | | 705/40 |
| 2013/0204785 A1* | 8/2013 | Monk | G06Q 20/322 |
| | | | 705/44 |
| 2013/0254110 A1* | 9/2013 | Royyuru | G06Q 20/36 |
| | | | 705/44 |
| 2018/0060862 A1* | 3/2018 | Groarke | H04L 67/02 |
| 2018/0103038 A1* | 4/2018 | Burke | G06F 16/9038 |
| 2020/0202342 A1* | 6/2020 | Thomas | G06Q 20/20 |

* cited by examiner

METHOD AND SYSTEM FOR TRANSLATING TRANSACTION MESSAGES

CROSS-REFERENCE TO RELATED APPLICATION

This application is a U.S. National Stage filing under 35 U.S.C. § 119, based on and claiming benefits of and priority to Singapore Patent Application No. 10201809808U filed on Nov. 5, 2018. The entire disclosure of the above application is incorporated herein by reference for all purposes.

FIELD OF THE INVENTION

The present invention relates to a method and a system for processing transactions, and, more particularly to a method and a system for translating and processing transaction messages.

BACKGROUND

Financial institutions, such as acquirers and issuers, interact with each other by transmitting and receiving transaction messages via payment networks. These transaction messages pertain to authorization, clearing, and settlement of transactions. The transaction messages transmitted and received by a financial institution have a specific format supported by the financial institution. For example, major payment networks, such as Mastercard®, RuPay®, and Diners Club®, support a standard message format (such as ISO8583). Similarly, there are many acquirers and issuers that support the standard message format.

However, certain financial institutions, such as local financial institutions of a country, support a domestic message format of the corresponding country and do not support the standard message format. Hence, when such local financial institutions engage in cross-country transactions or when they wish to avail services of a major payment networks, transaction messages from these financial institutions are routed to third-party vendors that translate the transaction messages having the domestic message formats to the standard message format and vice-versa.

A third-party vendor, typically, caters to a single country, translating transaction messages between the standard message format and a domestic message format associated with the corresponding country. Therefore, cross-country transactions between these local financial institutions involve multiple third-party vendors. Involvement of the third-party vendors in transactions may introduce security risks, since transaction messages often involve sensitive financial data. The involvement of multiple third-party vendors also causes delays in transmission and reception of the transaction messages, thereby causing delays in transaction processing.

In light of the foregoing, there exists a need for a solution that solves the aforementioned problems and eliminates the involvement of third-party vendors in transaction processing.

SUMMARY

In an embodiment of the present invention, a method for translating transaction messages for processing transactions is provided. The method includes receiving, by a server from a first acquirer of a plurality of acquirers, an inbound transaction message for a transaction. The inbound transaction message is pursuant to a first message format supported by the first acquirer. The inbound transaction message is translated by the server from the first message format to a second message format supported by the server when the first message format is different from the second message format. The inbound transaction message having the second message format is processed by the server to generate an outbound transaction message having the second message format. A third message format, supported by an issuer that corresponds to the transaction, is identified by the server from a plurality of message formats. The identification of the third message format is based on the outbound transaction message having the second message format. When the third message format is different from the second message format, the outbound transaction message is translated by the server from the second message format to the third message format. The outbound transaction message having the third message format is transmitted by the server to the issuer. The issuer processes the transaction based on the outbound transaction message having the third message format.

In another embodiment of the present invention, a system for translating transaction messages for processing transactions is provided. The system includes a payment network server that is configured to receive, from a first acquirer of a plurality of acquirers, an inbound transaction message for a transaction. The inbound transaction message is pursuant to a first message format supported by the first acquirer. The payment network server translates the inbound transaction message from the first message format to a second message format supported by the payment network server when the first message is different from the second message format. The payment network server processes the inbound transaction message having the second message format to generate an outbound transaction message having the second message format. The payment network server identifies, from a plurality of message formats, a third message format supported by an issuer that corresponds to the transaction. The identification of the third message format is based on the outbound transaction message having the second message format. When the third message format is different from the second message format, the payment network server translates the outbound transaction message from the second message format to the third message format. The payment network server transmits the outbound transaction message having the third message format to the issuer. The issuer processes the transaction based on the outbound transaction message having the third message format.

BRIEF DESCRIPTION OF THE DRAWINGS

Various embodiments of the present invention are illustrated by way of example, and not limited by the appended figures, in which like references indicate similar elements, and in which.

Figure 1:
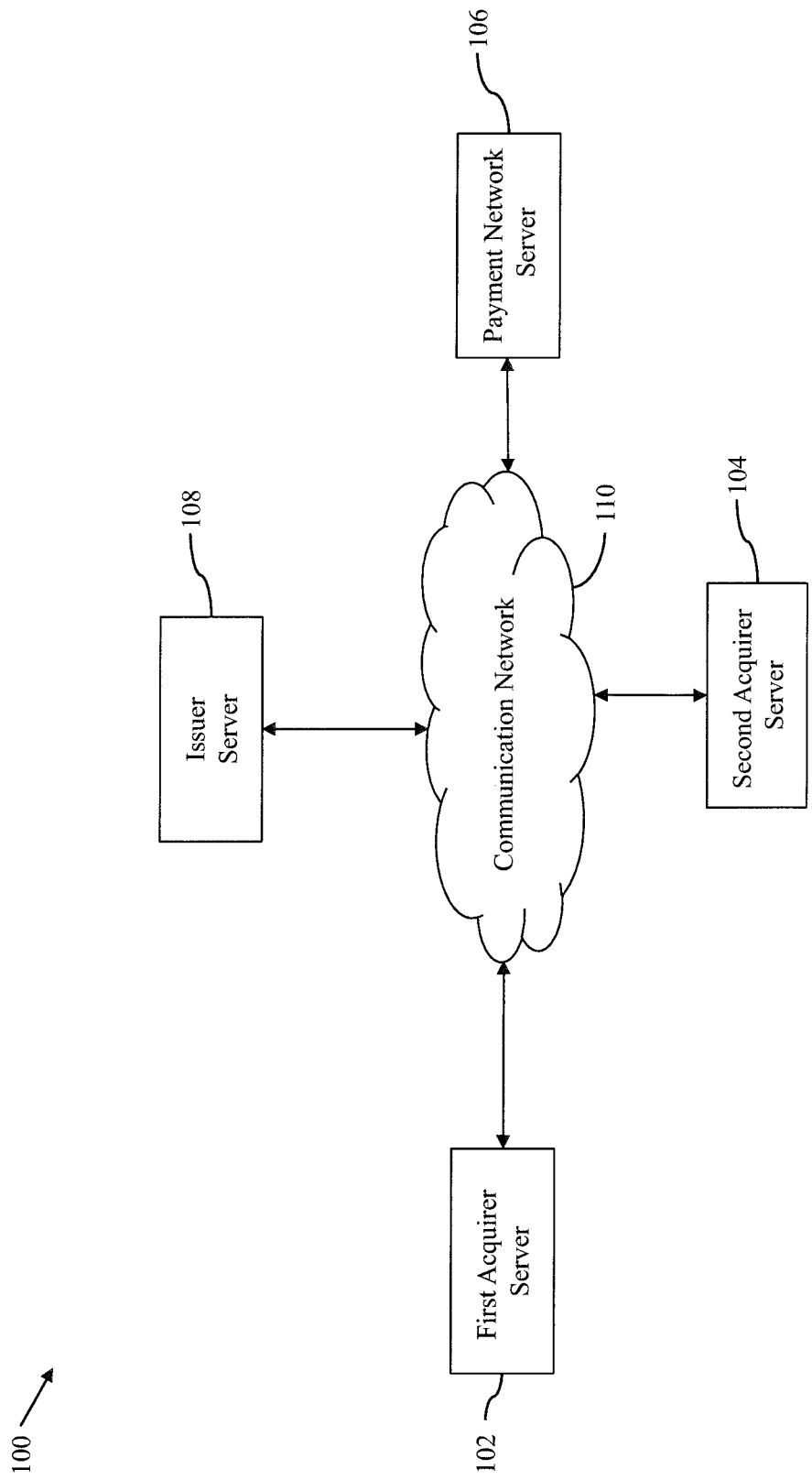
FIG. 1 is a block diagram that illustrates an exemplary environment for in which various embodiments of the present invention are practiced.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Financial institutions interact with each other by way of transaction messages. Each transaction message has a message format supported by the corresponding financial institution. Major financial institutions and payment networks support a standard message format for the transaction messages. However, certain financial institutions do not support the standard message format and use message formats that are local to their countries. Therefore, translation of transaction messages, between message formats, is required in case of cross-country transactions or when financial institutions that support local message formats wish to avail services of a major payment network. Typically, third-party vendors perform translation of the transaction messages between different message formats. However, a third-party vendor is only capable of translating transaction messages from a corresponding local message format to the standard message format and vice-versa. Therefore, multiple third-party vendors are involved in cross-country transactions, thereby posing security risks and delaying transaction processing.

Various embodiments of the present invention provide a method and a system that solve the abovementioned problems by allowing a payment network to offer a translation service for translating transaction messages between various message formats. The payment network assigns bulk identifiers (bulk IDs) to various acquirers based on their geographical locations and message formats supported by them. When a first acquirer generates and transmits, to the payment network, an inbound transaction message for authorization of a transaction, the inbound transaction message includes a first bulk ID assigned to the first acquirer and is pursuant to a first message format supported by the first acquirer. The payment network on receiving the inbound transaction message identifies the message format of the inbound transaction message based on the first bulk ID. If the first message format is different from a second message format supported by the payment network, the payment network translates the inbound transaction message from the first message format to the second message format. If the first message format is same as the second message format, no translation is performed. The payment network processes the inbound transaction message based on a service indicator included in the inbound transaction message and generates an outbound transaction message having the second message format.

Based on the outbound transaction message, the payment network identifies an issuer that corresponds to the transaction and a third message format supported by the issuer. If the third message format is same as the second message format, the outbound transaction message having the second message format is transmitted to the issuer. However, if the third message format is different from the second message format, the payment network generates and inserts a destination identifier in the outbound transaction message. The destination identifier is indicative of the third message format. The payment network then translates the outbound transaction message from the second message format to the third message format based on the destination identifier and transmits the outbound transaction message having the third message format to the issuer. The issuer processes the transaction based on the outbound transaction message having the third message format.

Thus, the method and system of the present invention enable the payment network to offer a translation service for translating transaction messages. In addition to this, the method and system mitigate security risks by eliminating the involvement of third-party vendors in the translation of transaction messages.

Terms Description (in Addition to Plain and Dictionary Meaning)

Transaction is an exchange of funds between two or more parties. For example, the transaction may include transferring a transaction amount from a customer to a merchant, when the customer makes a purchase from the merchant. In another example, the transaction may include dispensing cash, at an automated teller machine (ATM), equivalent to a transaction amount debited from an account of the customer based on a request from the customer.

Transaction messages are messages for communication among various financial institutions, such as acquirers, issuers, and/or payment networks, and pertain to transactions performed by customers of the financial institutions. For example, a transaction message for a transaction may pertain to any of authorization, clearing, or settlement of the transaction. A transaction message generally conforms to a message format supported by the corresponding financial institution.

Inbound transaction messages (often with respect to a payment network) are transaction messages transmitted by acquirers or issuers to payment networks. An inbound transaction message transmitted by an issuer or an acquirer is pursuant to a message format supported by the issuer or the acquirer, respectively. The inbound transaction message from the issuer or the acquirer includes a service indicator and a bulk ID assigned to the issuer or the acquirer.

Outbound transaction messages (often with respect to a payment network) are transaction messages transmitted by payment networks to issuers and acquirers. An outbound transaction message is generated by a payment network based on processing of a corresponding inbound transaction message by the payment network. The outbound transaction message generated by the payment network is pursuant to a message format supported by the payment network.

The message format defines fields and data elements for storing transaction specific details. Thus, for two different message formats, same transaction details may be stored under different fields and data elements.

Bulk IDs are identifiers assigned to issuers and acquirers by a payment network. A bulk identifier is assigned to an issuer or an acquirer based on a geographical location of the issuer or the acquirer and a message format supported by the issuer or the acquirer, respectively. An inbound transaction message from a financial institution, such as the acquirer or the issuer, includes a bulk ID assigned to the financial institution by the payment network. The payment network may translate the inbound transaction message from one message format to another, based on the bulk ID.

Destination identifier is a code or a flag inserted, by a payment network, in an outbound transaction message when a message format supported by an issuer or an acquirer that corresponds to the outbound transaction message is different from a message format supported by the payment network. Destination identifier is indicative of the message format supported by the issuer or acquirer.

Issuer is a financial institution that establishes and maintains customer accounts of several customers. The issuer authorizes and settles transactions in accordance with various payment network regulations and local legislation.

Acquirer is a financial institution that maintains terminal devices, such as ATMs and point-of-sale (POS) devices, used by customers to perform transactions. In one embodiment, the acquirer and the issuer are the same. In another embodiment, the acquirer and the issuer are different.

Payment networks, such as those operated by Mastercard, process transactions between acquirers and issuers. Processing by a payment network includes steps of authorization, clearing, and settlement.

Server is a physical or cloud data processing system on which a server program runs. The server may be implemented in hardware or software, or a combination thereof. In one embodiment, the server may be implemented in computer programs executing on programmable computers, such as personal computers, laptops, or a network of computer systems. The server may correspond to one of a payment network server, an issuer server, an acquirer server, or a merchant server.

FIG. 1 is a block diagram that illustrates an exemplary environment 100 in which various embodiments of the present invention are practiced. The environment 100 includes a first acquirer server 102, a second acquirer server 104, a payment network server 106, and an issuer server 108. The first acquirer server 102, the second acquirer server 104, the payment network server 106, and the issuer server 108 may communicate with each other by way of a communication network 110 or through separate communication networks established therebetween.

The first acquirer server 102 is a computing server that is operated by a first acquirer. The first acquirer is a financial institution that has contracted with various merchants to receive and process transactions initiated at those merchants. The first acquirer server 102 generates transaction messages for the transactions and communicates the transaction messages to corresponding issuers by way of the payment network server 106. The transaction messages generated by the first acquirer server 102 conform to a specific message format supported by the first acquirer. In a non-limiting example, it is assumed that the first acquirer is based out of a first country and supports a first message format, i.e., a domestic message format of the first country. Therefore, the first acquirer server 102 generates the transaction messages pursuant to the first message format. Each transaction message generated by the first acquirer server 102 includes a service indicator that is indicative of a function (such as authorization, clearing, settlement, translation, and/or a combination thereof) of the corresponding transaction message. In a non-limiting example, it is assumed that the service indicator is a four-digit numeric field 'xxxx'. The first acquirer server 102 transmits the transaction messages to the payment network server 106 by way of the communication network 110. In one embodiment, the first acquirer server 102 may transmit a transaction message to the payment network server 106 for performing batch processing on a batch of transactions. In another embodiment, the first acquirer server 102 transmits another transaction message to the payment network server 106 for processing a single transaction in real time.

Similarly, the second acquirer server 104 is a computing server that is operated by a second acquirer. The second acquirer is a financial institution that has contracted with various merchants to receive and process transactions initiated at those merchants. The second acquirer server 104 generates transaction messages for the transactions and communicates the transaction messages to corresponding issuers by way of the payment network server 106. The transaction messages generated by the second acquirer server 104 conform to a specific message format supported by the second acquirer. In a non-limiting example, it is assumed that the second acquirer is based out of a second country and supports a second message format, i.e., a domestic message format of the second country. Therefore, the second acquirer server 104 generates the transaction messages that are in the second message format. The second acquirer server 104 transmits the transaction messages to the payment network server 106 by way of the communication network 110. It will be apparent to a person having ordinary skill in the art that the second acquirer server 104 is functionally similar to the first acquirer server 102.

The payment network server 106 is a computing server that is operated by a payment network. The payment network is an intermediate entity between acquirers (for example, the first and second acquirers) and issuers for processing transactions. The payment network server 106 receives the transaction messages from the first and second acquirer servers 102 and 104 and routes them to the corresponding issuer server (for example, the issuer server 108). The payment network server 106 may also receive transaction messages from the issuer server 108 and transmit the transaction messages to the corresponding acquirer server (such as the first or second acquirer server 102 or 104). The transaction messages that are received by the payment network server 106 are hereinafter referred to as "inbound transaction messages" and the transaction messages that are transmitted by the payment network server 106 are hereinafter referred to as "outbound transaction messages". The payment network supports a third message format for the transaction messages. In a non-limiting example, it is assumed that the third message format is the International Organization for Standardization (ISO) format.

The payment network server 106 assigns bulk IDs to the acquirers and the issuers based on a message format supported by each issuer and acquirer and a geographical location (i.e., country) of each issuer and acquirer. For example, the payment network server 106 assigns a first bulk ID 'Rxx1' to all acquirers (e.g., the first acquirer) who support the first message format and are in the first country, and a second bulk ID 'Rxx2' to all acquirers (e.g., the second acquirer) who support the second message format and are in the second country. Thus, the first bulk ID 'Rxx1' assigned to the first acquirer indicates that the first acquirer is based out of the first country and supports the first message format. Likewise, the second bulk ID 'Rxx2' assigned to the second acquirer indicates that the second acquirer is based out of the second country and supports the second message format. The payment network server 106 maintains a first database that includes a list of the bulk IDs assigned by the payment network server 106 to the acquirers and the issuers and a list of message formats supported by the corresponding acquirers and the issuers. Each inbound transaction message received by the payment network server 106 includes a service indicator and a bulk ID. Based on the service indicator, the payment network server 106 determines the function of the corresponding inbound transaction message and processes it accordingly to generate a corresponding outbound transaction message. The payment network server 106 further offers a translation service to the acquirers and issuers, i.e., the payment network server 106 has the capability to translate the message formats of the transaction messages to other message formats.

In an exemplary scenario, the payment network server 106 receives an inbound transaction message having the first message format from the first acquirer server 102. The inbound transaction message includes the first bulk ID of the first acquirer and a service indicator. Based on the first bulk ID, the payment network server 106 refers the first database to identify the message format of the inbound transaction message. When the first message format of the inbound transaction message is different from the third message format supported by the payment network server 106, the payment network server 106 translates the inbound transaction message from the first message format to the third message format. The payment network server 106 then processes the translated inbound transaction message based on the service indicator and generates an outbound transaction message having the third message format. The payment network server 106 identifies an issuer that corresponds to the transaction associated with the outbound transaction message. The payment network server 106 again refers to the first database to identify the message format supported by the identified issuer. When the message format supported by the identified issuer is different from the third message format, the payment network server 106 translates the outbound transaction message to the message format of the identified issuer and transmits the translated outbound transaction message to the identified issuer for further processing. It will be apparent to a person skilled in the art that the payment network server 106 performs a similar set of operations when it receives an inbound transaction message from the issuer server 108 having a message format supported by the issuer server 108.

For providing the translation service, the payment network server 106 stores a plurality of conversion routines in its memory. In one example, the conversion routines are Java® Archive (JAR) files. Each JAR file is linked to a specific service indicator and refers to a specific translation. For example, a first JAR file is for translating a transaction message from the first message format to the third message format. The functions of the payment network server 106 are described in detail in conjunction with FIGS. 2, 3A, 3B, 4A, 4B, 5A, and 5B.

The issuer server 108 is a computing server operated by a first issuer that supports a fourth message format. The first issuer is a financial institution that manages customer accounts of multiple customers and issues transaction cards to them for performing transactions. The issuer server 108 receives transaction messages of various transactions from the payment network server 106 and processes the transactions based on the transaction messages. The processing of transactions may include, but not limited to, authorization, clearing, and settlement of transactions.

Examples of the first and second acquirer servers 102 and 104, the payment network server 106, and the issuer server 108 include, but are not limited to, computers, laptops, mini-computers, mainframe computers, any non-transient and tangible machines that can execute a machine-readable code, cloud-based servers, distributed server networks, a network of computer systems, or a combination thereof.

The communication network 110 is a medium through which transaction messages are transmitted between the first acquirer server 102, the second acquirer server 104, the payment network server 106, and the issuer server 108, and other entities that are pursuant to one or more standards for the interchange of transaction messages. Examples of the communication network 110 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 110 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof.

Figure 2:
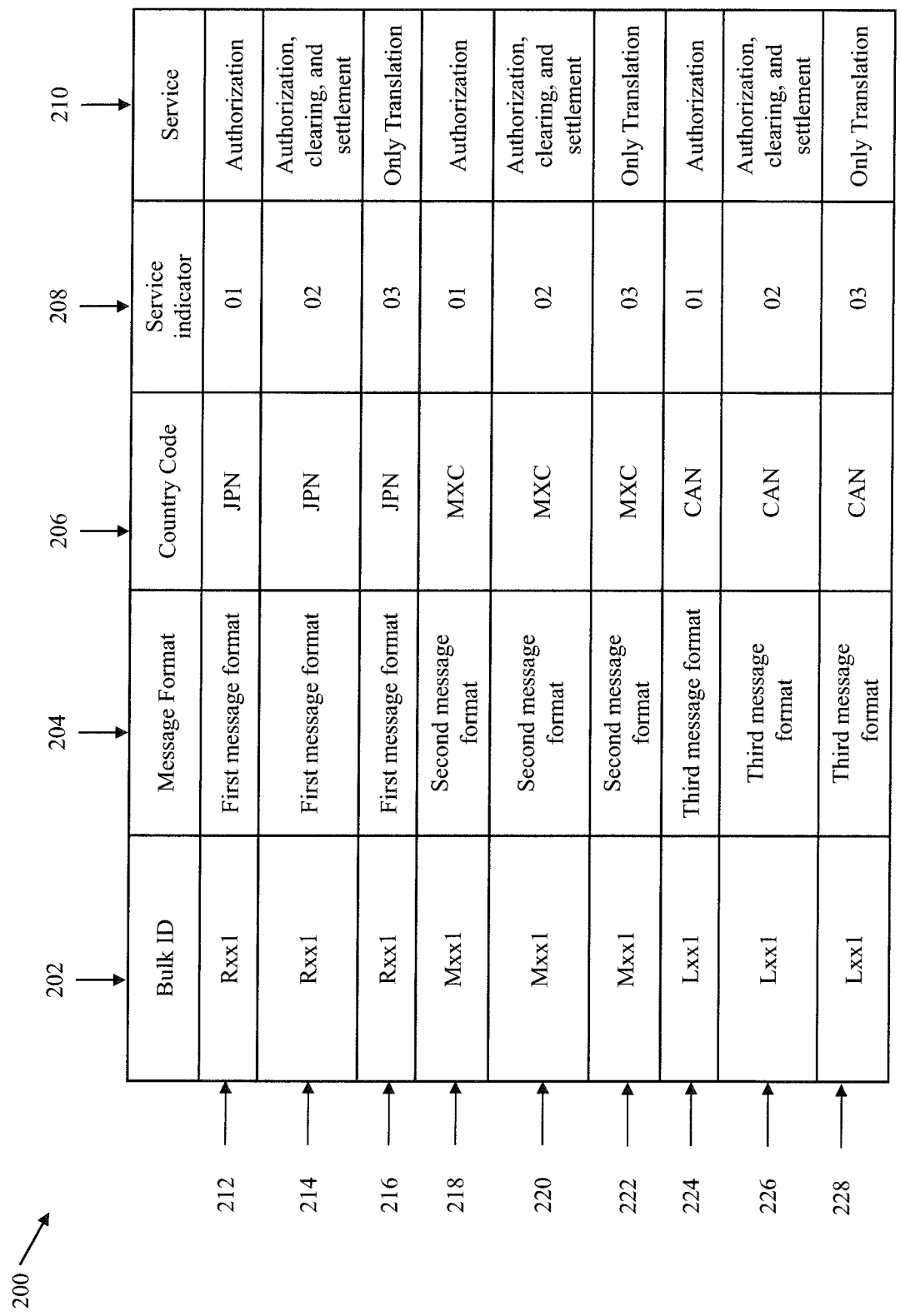
FIG. 2 is a table that illustrates an exemplary database maintained at a payment network server of FIG. 1, in accordance with an embodiment of the present invention.

FIG. 2 is a Table 200 that illustrates the first database maintained at the payment network server 106, in accordance with an embodiment of the present invention. Table 200 is shown to include first through fifth columns 202-210 and first through ninth rows 212-228.

The first column 202 includes various bulk IDs assigned by the payment network server 106. The second and third columns 204 and 206 include message formats and country codes, respectively, based on which the bulk IDs included in the first column 202 are assigned. The fourth column 208 includes service indicators for the functions supported by the payment network and the fifth column 210 includes a description of the functions based on the corresponding service indicators. The payment network server 106 further stores various JAR files linked to the service indicators of the fourth column 208 in its memory.

Figure 5A:
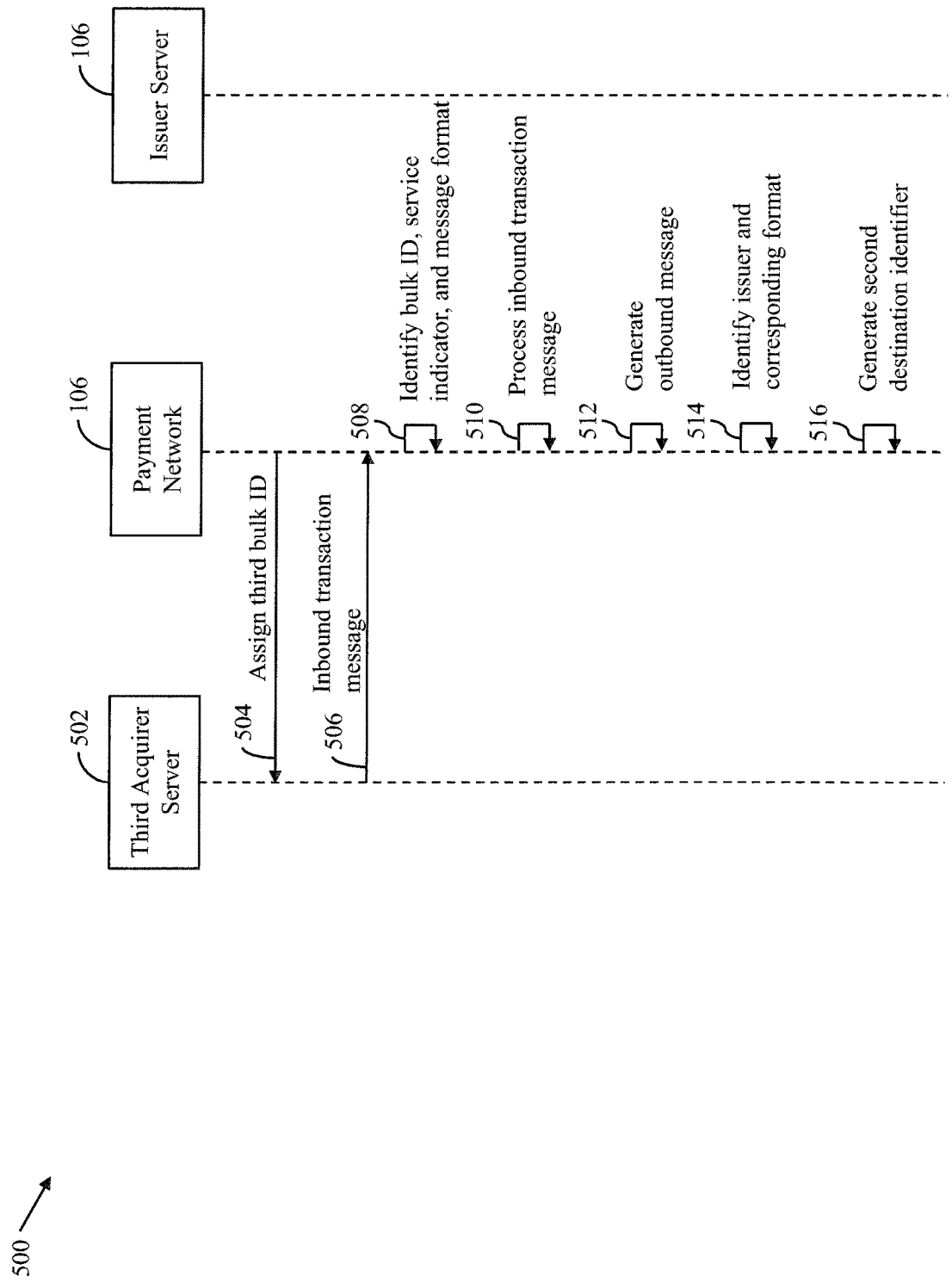
FIGS. 5A and 5B, collectively represent a process flow diagram that illustrates an exemplary scenario for translating transaction messages for processing transactions, in accordance with yet another embodiment of the present invention.
Figure 5B:
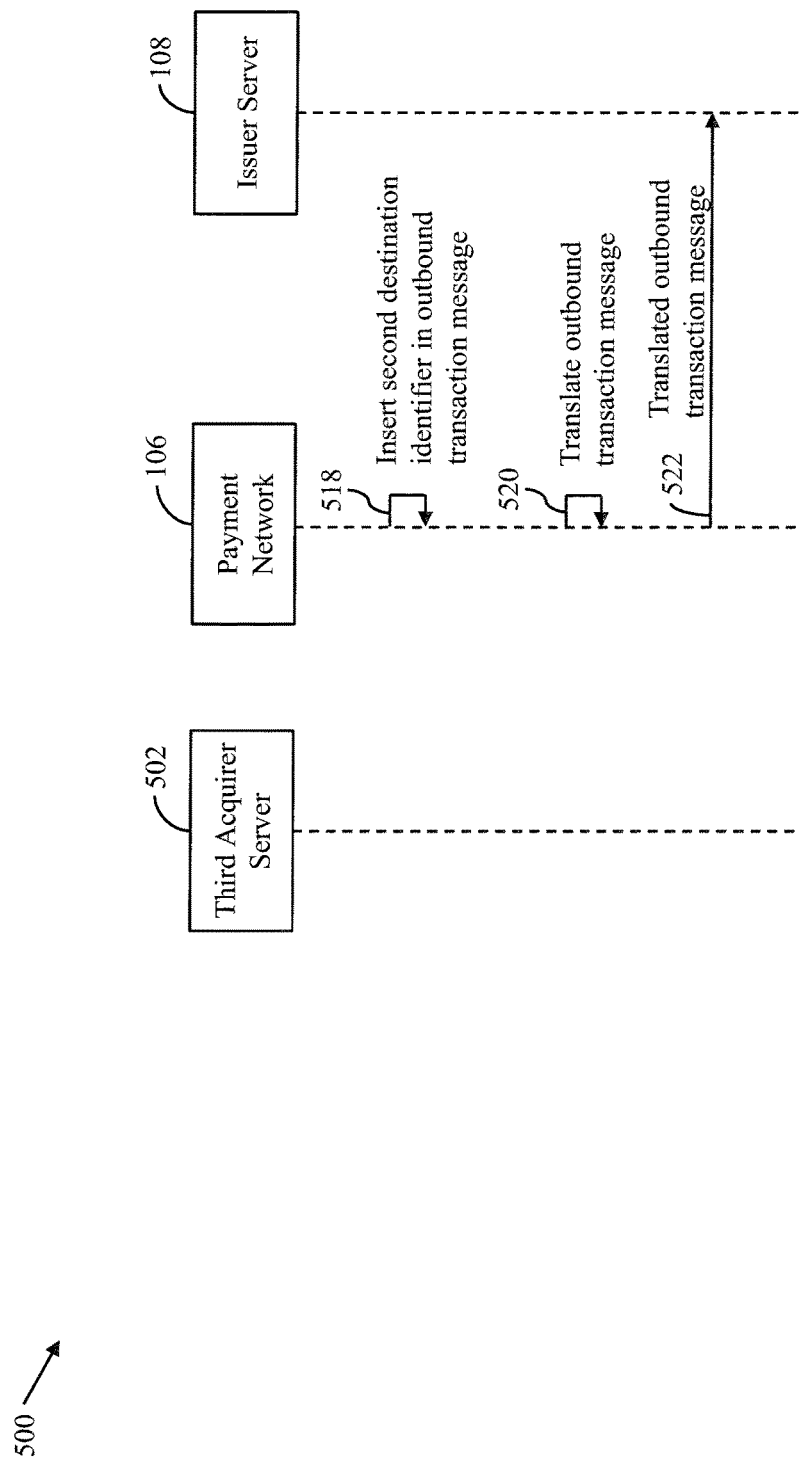

The first row 212 indicates that the first bulk ID 'Rxx1' is assigned to the first acquirer that supports the first message format and has a country code 'JPN' (Japan). The first row 212 further includes a service indicator '01'. When an inbound transaction message including the service indicator '01' is received by the payment network server 106, the payment network server 106 processes the inbound transaction message for authorization. The second row 214 is similar to the first row 212, but includes a service indicator '02'. When an inbound transaction message including the service indicator '02' is received by the payment network server 106, the payment network server 106 processes the inbound transaction message for authorization, clearing, and settlement. The third row 216 is similar to the second row 214, but includes a service indicator '03'. When an inbound transaction message having the first message format and including the service indicator '03' is received by the payment network server 106, the payment network server 106 does not process the inbound transaction message for authorization, clearing, or settlement. The payment network server 106, simply, translates the inbound transaction message. Likewise, the fourth row 218 indicates that the second bulk ID 'Mxx1' is assigned to the second acquirer that supports the second message format and has a country code 'MXC' (Mexico). The fourth row 218 also includes the service indicator '01'. The fifth row 220 is similar to the fourth row 218, but includes the service indicator '02'. The sixth row 222 is similar to the fifth row 220, but includes the service indicator '03'. When an inbound transaction message having the second message format and including the service indicator '03' is received by the payment network server 106, the payment network server 106 does not process the inbound transaction message for authorization, clearing, or settlement. The payment network server 106, simply, translates the inbound transaction message from the second message format. Likewise, the seventh row 224 indicates that a third bulk ID 'Lxx1' is assigned to a third acquirer (as shown in FIGS. 5A and 5B) that supports the third message format and has a country code 'CAN' (Canada). The seventh row 224 also includes the service indicator '01'. The eighth row 226 is similar to the seventh row 224 but includes the service indicator '02'. The ninth row 228 is similar to the eighth row 224, but includes the service indicator '03'. When an inbound transaction message having the third message format and including the service indicator '03' is received by the payment network server 106, the payment network server 106 does not process the inbound transaction message for authorization, clearing, or settlement. The payment network server 106, simply, translates the inbound transaction message.

It will be apparent to a person having ordinary skill in the art that Table 200 is shown for illustrative purpose and should not be construed to limit the scope of the invention. The first database may further include message formats, bulk IDs, country codes of other acquirers and issuers, such as the first issuer and service indicators of other services offered by the payment network without deviating from the scope of the invention. Further, format of the bulk IDs shown in Table 200 is for exemplary purpose and should not be construed to limit the scope of the invention.

Figure 3A:
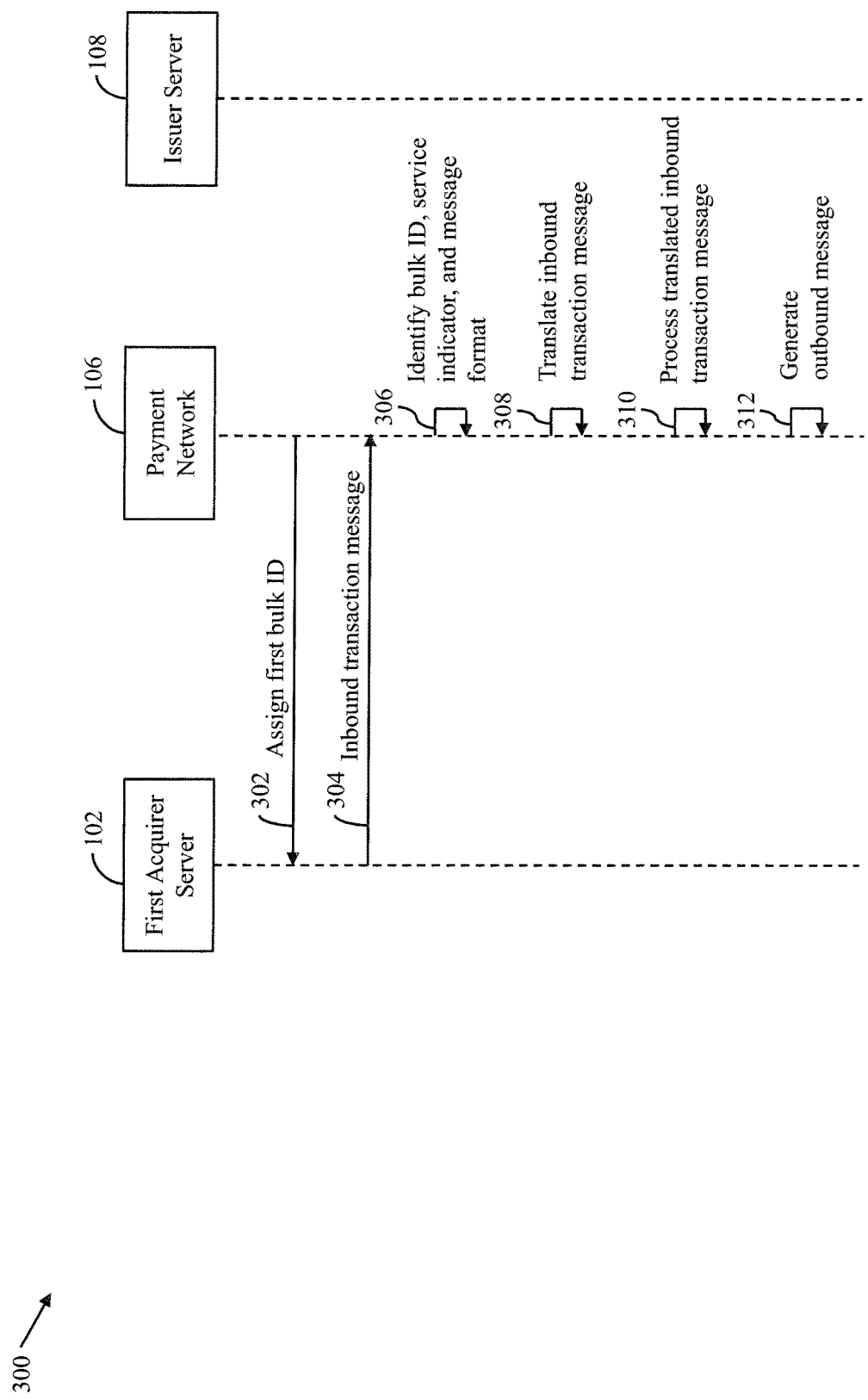
FIGS. 3A and 3B, collectively represent a process flow diagram that illustrates an exemplary scenario for translating transaction messages for processing transactions, in accordance with an embodiment of the present invention.
Figure 3B:
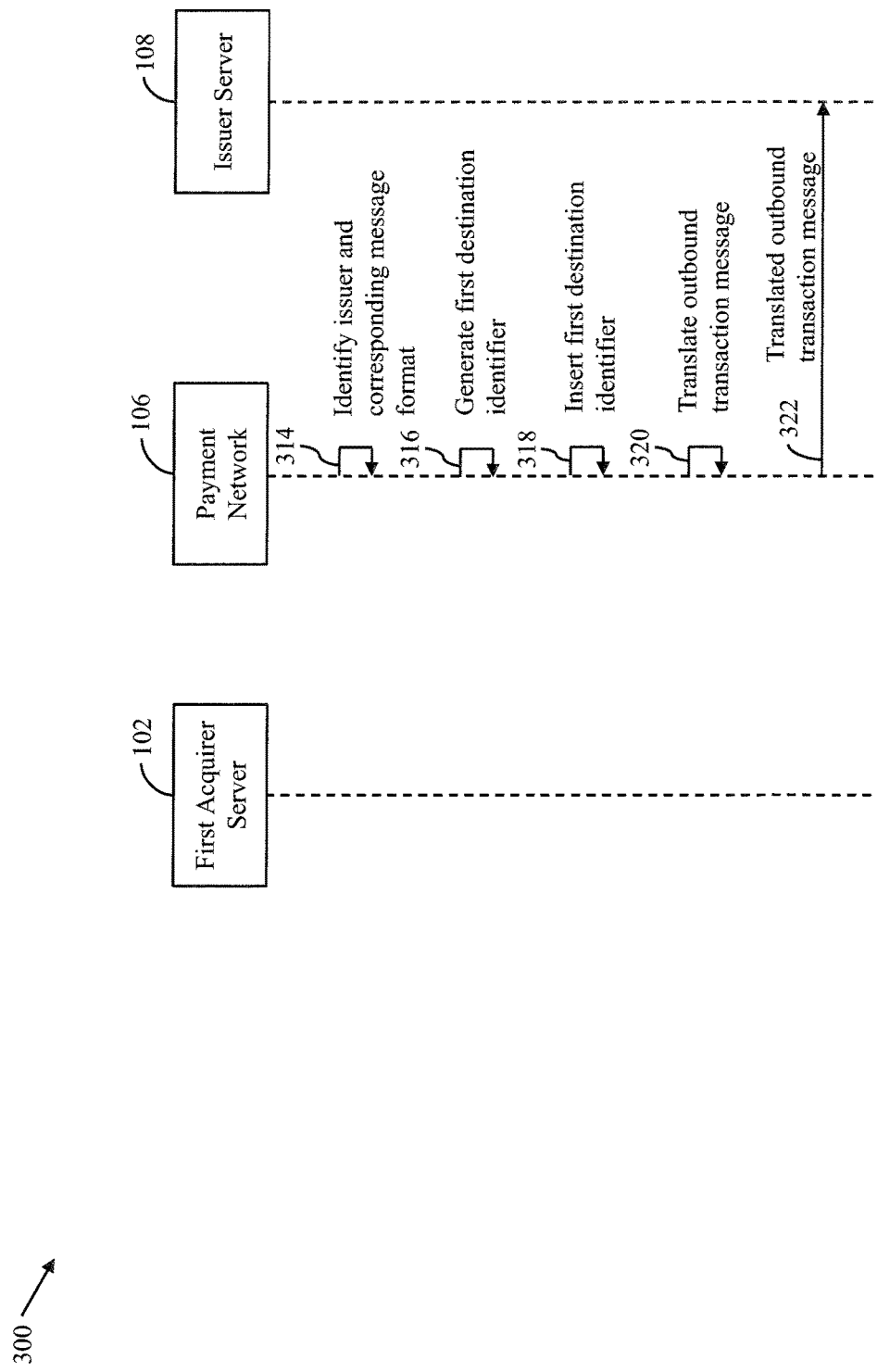

FIGS. 3A and 3B, collectively represent a process flow diagram 300 that illustrates an exemplary scenario for translating transaction messages for processing transactions, in accordance with an embodiment of the present invention. The process flow diagram 300 involves the first acquirer server 102, the payment network server 106, and the issuer server 108. The process flow diagram 300 illustrates a scenario where the first, third, and fourth message formats supported by the first acquirer, the payment network, and the first issuer, respectively, are different.

The payment network server 106 assigns the first bulk ID (e.g., 'Rxx1') to the first acquirer operating the first acquirer server 102 (as shown by arrow 302). The first bulk ID 'Rxx1' indicates that the first acquirer is based out of the first country and supports the first message format. Likewise, the payment network server 106 has assigned bulk IDs to other acquirers and issuers as shown in Table 200. The first acquirer server 102 transmits a first inbound transaction message, which is a request for authorizing a first transaction, to the payment network server 106 (as shown by arrow 304). The first inbound transaction message is pursuant to the first message format supported by the first acquirer and includes the first bulk ID 'Rxx1' and the service indicator '01'.

The payment network server 106 receives the first inbound transaction message and identifies the first bulk ID 'Rxx1' and the service indicator '01' included in the first inbound transaction message (as shown by arrow 306). The payment network server 106 uses the first bulk ID 'Rxx1' and the service indicator '01' to look up the first database (i.e., Table 200) for identifying a message format of the first inbound transaction message (as shown by arrow 306) and a function to be performed on the first inbound transaction message. In this scenario, the payment network server 106 identifies that the first inbound transaction message is in the first message format. Based on the service indicator '01', the payment network server 106 further determines that first inbound transaction message is to be translated from the first message format to the third message format and processed for authorization of the first transaction.

For translating the first inbound transaction message from the first message format to the third message format, the payment network server 106 selects and invokes the first JAR file, which is linked to the service indicator '01' and the first bulk ID 'Rxx1' (as shown by arrow 308). During translation, the first JAR file extracts information from data elements (DEs) of the first inbound transaction message and stores the information in respective DEs of the third message format. For example, the first JAR file extracts a transaction card number from a permanent account number (PAN) field of the first message format and stores it in a second DE of the third message format.

The payment network server 106 then processes the translated first inbound transaction message for authorization (as shown by arrow 310) and generates a first outbound transaction message (as shown by arrow 312). The first outbound transaction message is generated by populating one or more DEs (for example, DEs pertinent to the authorization of the first transaction) in the translated first inbound transaction message with appropriate information, as is known to those of skill in the art. The first outbound transaction message is pursuant to the third message format supported by the payment network. The payment network server 106 identifies the first issuer that corresponds to the first transaction and, consequently, identifies a message format (i.e., the fourth message format) supported by the first issuer by referring to the first database (as shown by arrow 314).

When the payment network server 106 identifies that the fourth message format supported by the first issuer is different from the third message format, the payment network server 106 generates a first destination identifier (for example, a flag) for the first outbound transaction message (as shown by arrow 316). In one embodiment, the first destination identifier, generated by the payment network server 106 for a transaction, is a 19-byte code that has 5 bytes reserved for a sequence number of the transaction, 11 bytes reserved for an identifier (such as a bulk ID) of an issuer of the transaction, and the remaining 3 bytes reserved for a country code of the issuer. In the current scenario, the first destination identifier generated by the payment network server 106 for the first outbound transaction message is indicative of the first issuer and a geographical location (i.e., the country code) of the first issuer. The payment network server 106 may generate the first destination identifier by referring to the first database. The payment network server 106 inserts the first destination identifier in the first outbound transaction message having the third message format (as shown by arrow 318).

Based on the first destination identifier, the payment network server 106 selects and invokes a second JAR file for translating the first outbound transaction message from the third message format to the fourth message format supported by the first issuer. The second JAR file translates the first outbound transaction message from the third message format to the fourth message format (as shown by arrow 320). Translation of the first outbound transaction message from the third message format to the fourth message format is similar to the translation of the first inbound message. The payment network server 106 transmits the first outbound transaction message having the fourth message format to the issuer server 108 (as shown by arrow 322). The issuer server 108 processes the first transaction based on the translated first outbound transaction message. In the current scenario, the issuer server 108 processes the first transaction for authorization.

The issuer server 108 then communicates the response of authorization to the first acquirer server 102. The communication of the response to the first acquirer server 102 again involves a two-step translation (i.e., the fourth message format to the third message format and the third message format to the first message format) performed by the payment network server 106.

Figure 4A:
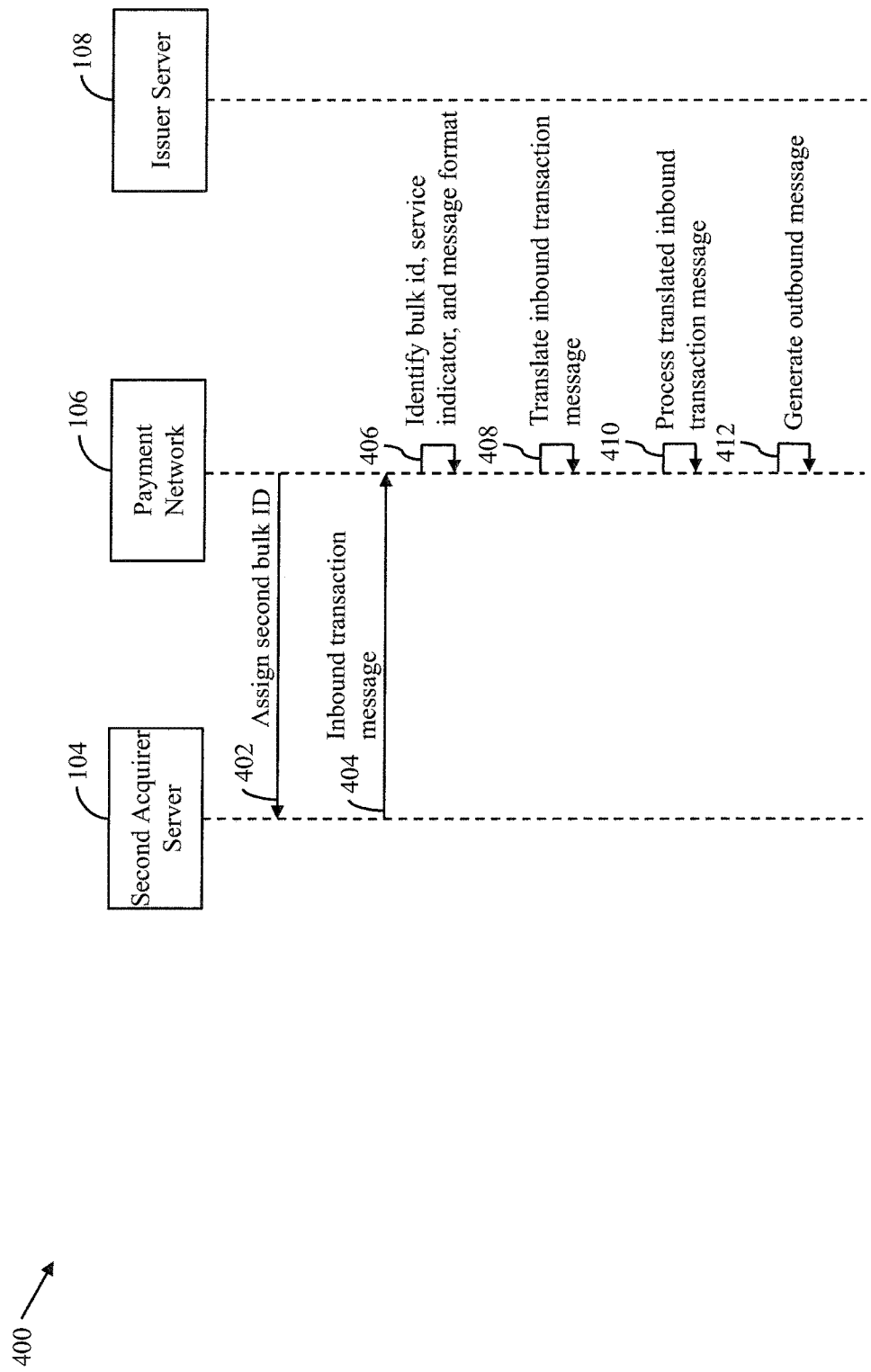
FIGS. 4A and 4B, collectively represent a process flow diagram that illustrates an exemplary scenario for translating transaction messages for processing transactions, in accordance with another embodiment of the present invention.
Figure 4B:
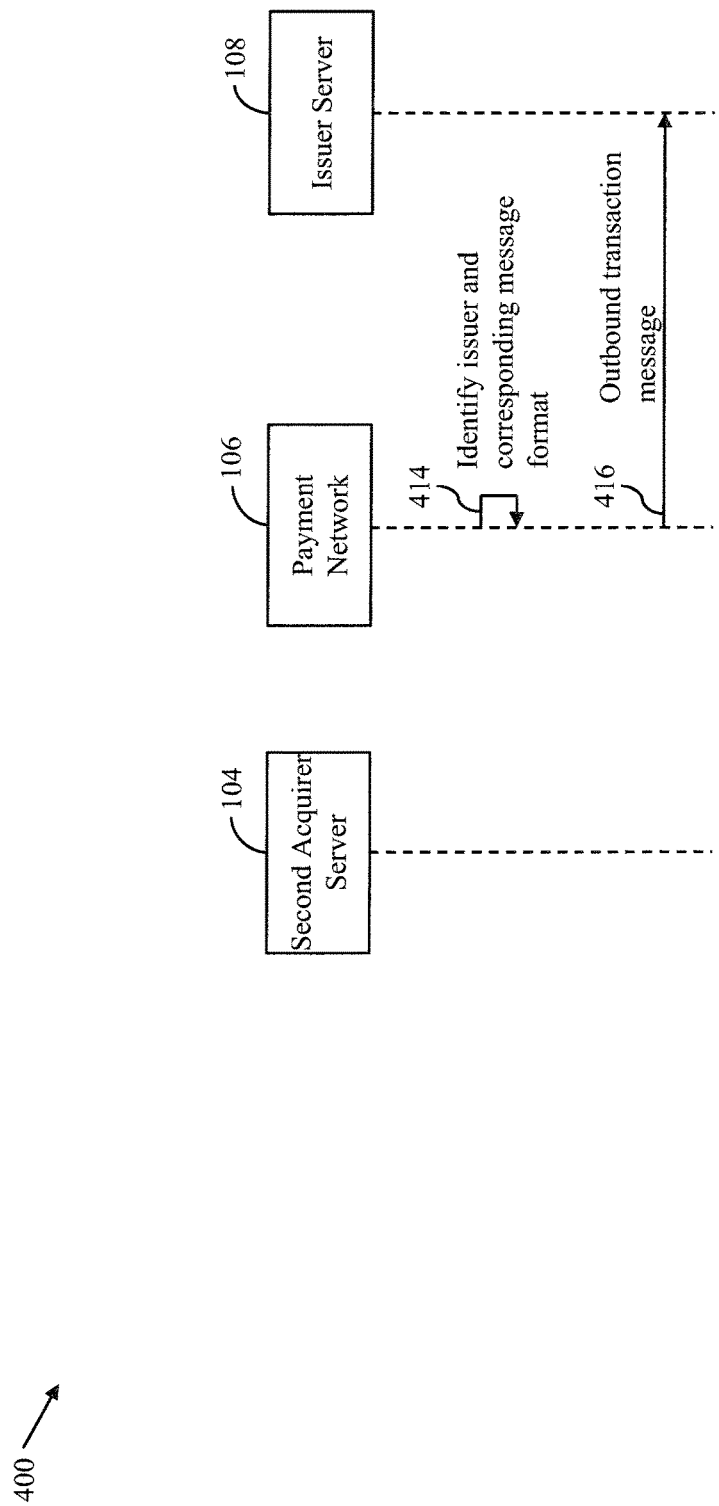

FIGS. 4A and 4B, collectively represent a process flow diagram 400 that illustrates an exemplary scenario for translating transaction messages for processing transactions, in accordance with another embodiment of the present invention. The process flow diagram 400 involves the second acquirer server 104, the payment network server 106, and the issuer server 108. The process flow diagram 400 illustrates a scenario where the second message format supported by the second acquirer is different from the third message format supported by the payment network, but the fourth message format supported by the first issuer is same as the third message format.

The payment network server 106 assigns the second bulk ID (i.e., 'Mxx1') to the second acquirer operating the second acquirer server 104 (as shown by arrow 402). The second bulk ID 'Mxx1' indicates that the second acquirer is based out of the second country and supports the second message format. The payment network server 106 maintains the first database (for example, Table 200) that stores the bulk IDs assigned to other acquirers and issuers. The second acquirer server 104 transmits a second inbound transaction message for a second transaction to the payment network server 106 (as shown by arrow 404). The second inbound transaction message is pursuant to the second message format supported by the second acquirer and includes the second bulk ID 'Mxx1' and the service indicator '02'.

The payment network server 106 receives the second inbound transaction message and identifies the second bulk ID and the service indicator '02' included in the second inbound transaction message (as shown by arrow 406). The payment network server 106 uses the second bulk ID 'Mxx1' and the service indicator '02' to look up the first database (i.e., Table 200) for identifying a message format of the second inbound transaction message (as shown by arrow 406) and a function to be performed on the second inbound transaction message. In this scenario, the payment network server 106 identifies that the second inbound transaction message is in the second message format. Based on the service indicator '02', the payment network server 106 further determines that second inbound transaction message is to be translated from the second message format to the third message format and processed for authorization, clearing, and settlement of the second transaction.

For translating the second inbound transaction message from the second message format to the third message format, the payment network server 106 selects and invokes a third JAR file linked to the service indicator '02' and the second bulk ID 'Mxx1' (as shown by arrow 408). During translation, the third JAR file extracts information from the DEs of the second inbound transaction message and stores the information in respective DEs of the third message format. For example, the third JAR file extracts a transaction card number from a permanent account number (PAN) field of the second message format and stores it in the second DE of the third message format.

The payment network server 106 then processes the translated second inbound transaction message for authorization, clearing, and settlement (as shown by arrow 410) and generates a second outbound transaction message pursuant to the third message format (as shown by arrow 412). The second outbound transaction message is generated by populating one or more DEs (for example, DEs pertinent to the authorization, clearing, and settlement of the second transaction) in the translated second inbound transaction message with appropriate information, as is known by those of skill in the art. The second outbound transaction message is pursuant to the third message format supported by the payment network. The payment network server 106 identifies the first issuer that corresponds to the first transaction and, consequently, identifies a message format supported by the first issuer by referring to the first database (as shown by arrow 414).

When the payment network server 106 identifies that the fourth message format supported by the first issuer is the same as the third message format, the payment network server 106 transmits the second outbound transaction message having the third message format to the issuer server 108 (as shown by arrow 416). Since, the fourth message format is same as the third message format, the payment network server 106 does not translate the second outbound transaction message.

The issuer server 108 then communicates a response to the second acquirer server 104. The communication of the response to the second acquirer server 104 again involves a single-step translation (i.e., the fourth message format to the second message format) performed by the payment network server 106.

FIGS. 5A and 5B, collectively represent a process flow diagram 500 that illustrates an exemplary scenario for translating transaction messages for processing transactions, in accordance with yet another embodiment of the present invention. The process flow diagram 500 involves the payment network server 106, the issuer server 108, and a third acquirer server 502 operated by the third acquirer. The third acquirer supports the third message format. The process flow diagram 500 illustrates a scenario where both the payment network and the third acquirer support the same message format (i.e., the third message format), but the first issuer supports the fourth message format that is different from the third message format.

The payment network server 106 assigns the third bulk ID 'Lxx1' to the third acquirer operating the third acquirer server 502 (as shown by arrow 504). The third bulk ID 'Lxx1' indicates that the third acquirer is based out of a third country and supports the third message format. The payment network server 106 maintains the first database (i.e., Table 200) that stores the bulk IDs assigned to other acquirers and issuers.

The third acquirer server 502 transmits a third inbound transaction message, which is a request for authorizing a third transaction, to the payment network server 106 (as shown by arrow 506). The third inbound transaction message is pursuant to the third message format supported by the third acquirer and the payment network and includes the third bulk ID 'Lxx1' and the service indicator '01'.

The payment network server 106 receives the third inbound transaction message and identifies the third bulk ID 'Lxx1' and the service indicator '01' included in the third inbound transaction message (as shown by arrow 508). The payment network server 106 uses the first bulk ID 'Lxx1' and the service indicator '01' to look up the first database (i.e., Table 200) for determining a message format of the third inbound transaction message (as shown by arrow 508) and a function to be performed on the third inbound transaction message. In this scenario, the payment network server 106 determines that the third inbound transaction message is in the third message format. Based on the service indicator '01', the payment network server 106 further determines that first inbound transaction message is to be processed for authorization of the third transaction. The payment network server 106 does not perform translation of the third inbound transaction message as the third inbound transaction message is already in the third message format supported by the payment network.

The payment network server 106 processes the third inbound transaction message for authorization (as shown by arrow 510) and generates a third outbound transaction message (as shown by arrow 512). The third outbound transaction message is generated by populating one or more DEs (for example, DEs pertinent to the authorization of the third transaction) in the third inbound transaction message with appropriate information, as is known by those of skill in the art. The third outbound transaction message is pursuant to the third message format supported by the payment network. The payment network server 106 identifies the first issuer that corresponds to the third transaction and, consequently, identifies a message format supported by the first issuer by referring to the first database (as shown by arrow 514).

When the payment network server 106 identifies that the fourth message format supported by the first issuer is different from the third message format, the payment network server 106 generates a second destination identifier for the third outbound transaction message (as shown by arrow 516). In the current scenario, the second destination identifier generated by the payment network server 106 for the third outbound transaction message is indicative of the first issuer and the geographical location (i.e., the country code) of the first issuer. The payment network server 106 inserts the second destination identifier in the third outbound transaction message having the third message format (as shown by arrow 518).

Based on the second destination identifier, the payment network server 106 selects and invokes a JAR file (such as the second JAR file) for translating the third outbound transaction message from the third message format to the fourth message format supported by the first issuer. The fourth JAR file translates the third outbound transaction message from the third message format to the fourth message format (as shown by arrow 520). The payment network server 106 transmits the third outbound transaction message having the fourth message format to the issuer server 108 (as shown by arrow 522). The issuer server 108 processes the third transaction based on the translated third outbound transaction message. In the current scenario, the issuer server 108 processes the third transaction for authorization.

In one embodiment, the payment network server 106 provides a user interface (UI) tool that allows financial institutions (such as acquirers, issuers, and other payment networks) to test the translation service offered by the payment network server 106. During testing, the UI tool allows a financial institution to convert a test transaction message from a message format to any other message format. For creating the test transaction message, the UI tool presents various editable data fields for enabling the financial institution to provide transaction details for the test transaction message. Once the editable data fields are filled, the UI tool presents a list of message formats to the financial institution for selection. The test transaction message is then created in the message format selected by the financial institution. After the creation of the test transaction message, the UI tool again presents the list of message formats to the financial institution for selection. The UI tool then translates the created test transaction message to the selected message format.

In another embodiment, the first acquirer server 102 transmits a fourth inbound transaction message, which is a request for translating the fourth inbound transaction message, to the payment network server 106. The fourth inbound transaction message is pursuant to the first message format supported by the first acquirer and includes the first bulk ID 'Rxx1' and the service indicator '03'. Based on the first bulk ID, the payment network server 106 determines that the fourth inbound transaction message is in the first message format. Based on the service indicator '03', the payment network server 106 further determines that the fourth inbound transaction message is to not to be processed, but translated to the third message format. The payment network server 106 translates the fourth inbound transaction message from the first message format to the third message format, supported by the payment network.

For translating the fourth inbound transaction message from the first message format to the third message format, the payment network server 106 selects and invokes a fourth JAR file linked to the service indicator '03' and the first bulk ID 'Rxx1'. During translation, the fourth JAR file extracts information from the DEs of the fourth inbound transaction message and stores the information in respective DEs of the third message format. For example, the third JAR file extracts a transaction card number from a permanent account number (PAN) field of the first message format and stores it in the second DE of the third message format.

The payment network server 106 identifies the first issuer that corresponds to the translated fourth inbound transaction message (hereinafter, 'fourth outbound transaction message') and identifies the message format supported by the first issuer. In this embodiment, for the sake of simplicity, it is assumed that the fourth message format supported by the first issuer is the same as the third message format. Consequently, the payment network server 106 transmits the fourth outbound transaction message to the issuer server 108.

Figure 6:
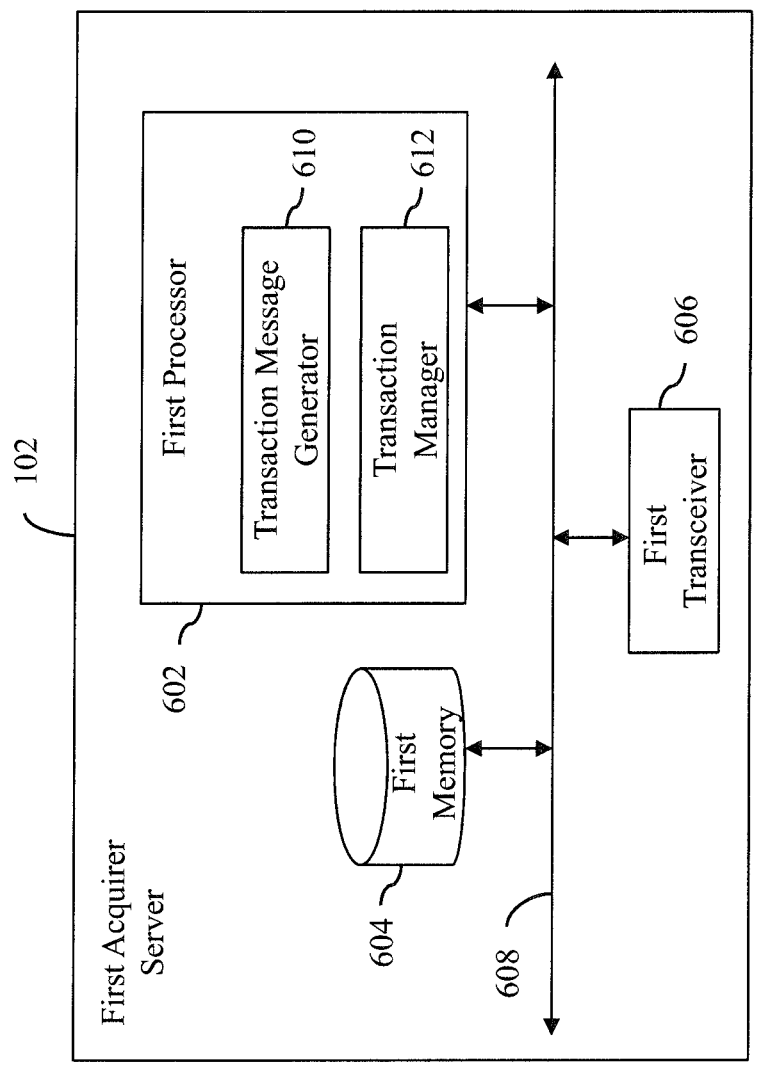
FIG. 6 is a block diagram that illustrates a first acquirer server of the FIG. 1, in accordance with an embodiment of the invention.

FIG. 6 is a block diagram that illustrates the first acquirer server 102, in accordance with an embodiment of the present invention. The first acquirer server 102 includes a first processor 602, a first memory 604, and a first transceiver 606. The first processor 602, the first memory 604, and the first transceiver 606 communicate with each other by way of a first communication bus 608.

The first processor 602 includes suitable logic, circuitry, and/or interfaces for generating transaction messages and managing transactions. The first processor 602 receives the first bulk ID assigned to the first acquirer by the payment network server 106 and stores the first bulk ID in the first memory 604. The first processor 602 generates various types of transaction messages such as transaction messages for authorization, clearing, or settlement of transactions. The first processor 602, further, performs credit and debit operations based on the transactions. The first processor 602 includes a transaction message generator (TMG) 610 and a transaction manager 612.

The TMG 610 generates transaction messages pertaining to authorization, clearing, or settlement of the transactions. The transaction messages (for example, the first inbound transaction message) generated by the TMG 610 are pursuant to the first message format supported by the first acquirer. The TMG 610 inserts, in the transaction messages, the first bulk ID and service indicators based on functions of the transaction messages as described in FIGS. 3A and 3B. The TMG 610 further inserts other information in the transaction messages, such as first and second identification codes that are indicative of an origin (i.e., the first acquirer server 102) and a destination (i.e., the issuer server 108) of the transaction messages.

The transaction manager 612 performs credit and debit operations based on the transactions that correspond to the first acquirer. In one example, a customer may make a purchase at a POS device of a merchant, who has a merchant account maintained at the first acquirer. In this scenario, the transaction manager 612 debits or credits the merchant account based on the purchase made by the customer at the POS device. In another example, the customer may perform another transaction (such as cash withdrawal) at an ATM linked to the first acquirer. Consequently, the transaction manager 612 instructs the ATM to dispense cash based on a transaction amount of the transaction.

The first memory 604 includes suitable logic, circuitry, and/or interfaces for storing the first bulk ID assigned to the first acquirer by the payment network server 106. The first memory 604 stores merchant account information of various merchant accounts maintained at the first acquirer. The first memory 604 further stores transaction records, credit history, transaction history, or the like for each merchant account. Examples of the first memory 604 include a random-access memory (RAM), a read-only memory (ROM), a removable storage drive, a hard disk drive (HDD), a flash memory, a solid-state memory, and the like. It will be apparent to a person skilled in the art that the scope of the invention is not limited to realizing the first memory 604 in the first acquirer server 102, as described herein. In another embodiment, the first memory 604 may be realized in form of a database server or a cloud storage working in conjunction with the first acquirer server 102, without departing from the scope of the invention.

The first transceiver 606 transmits and receives, using one or more communication network protocols, data over the communication network 110. The first transceiver 606 transmits various requests and messages to the payment network server 106. Examples of the first transceiver 606 include, but are not limited to, an antenna, a radio frequency transceiver, a wireless transceiver, a Bluetooth transceiver, an ethernet port, a universal serial bus (USB) port, or any other device configured to transmit and receive data.

It will be apparent to a person skilled in the art that the second acquirer server 104 and the third acquirer server 502 are functionally similar to the first acquirer server 102 and can be implemented by way of the block diagram of FIG. 6.

Figure 7:
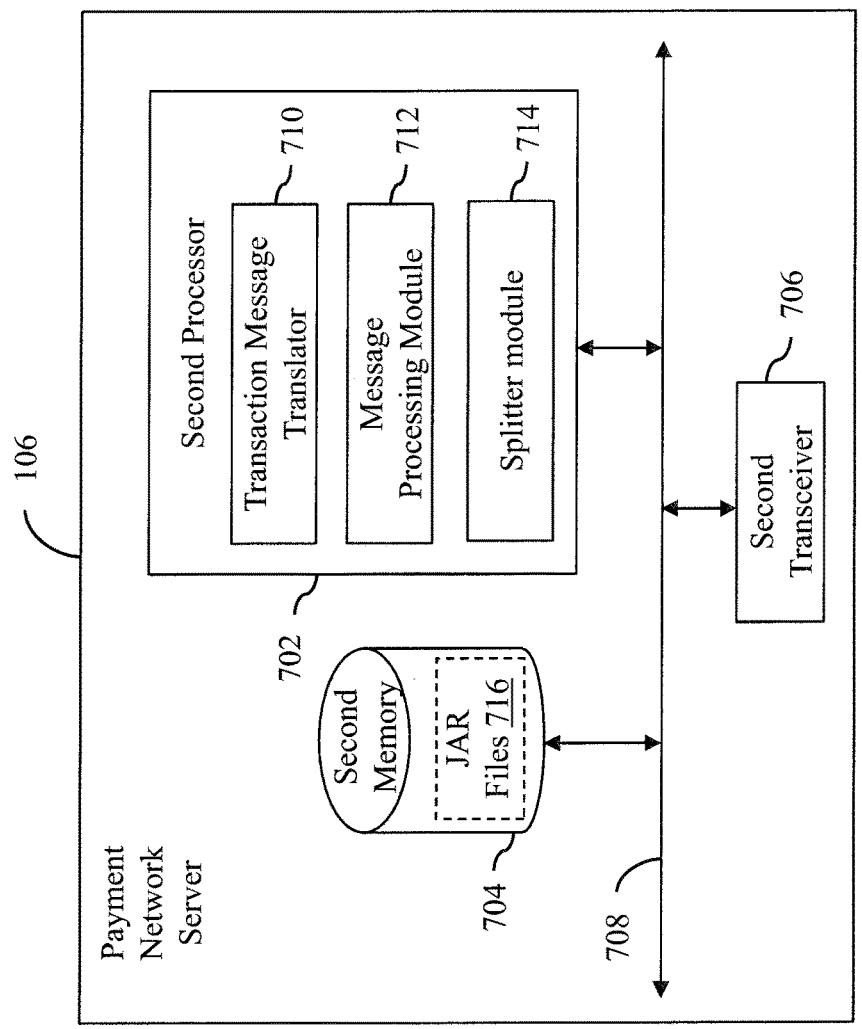
FIG. 7 is a block diagram that illustrates the payment network server of the FIG. 1, in accordance with an embodiment of the invention.

FIG. 7 is a block diagram that illustrates the payment network server 106, in accordance with an embodiment of the present invention. The payment network server 106 includes a second processor 702, a second memory 704, and a second transceiver 706. The second processor 702, the second memory 704, and the second transceiver 706 communicate with each other by way of a second communication bus 708.

The second processor 702 includes suitable logic, circuitry, and/or interfaces for translating and processing transaction messages. The second processor 702 assigns bulk IDs to various issuers and acquirers based on their geographical locations and message formats they support. For example, the second processor 702 assigns the first, second, and third bulk IDs to the first, second, and third acquirers, respectively, as shown in Table 200. The second processor 702 stores, in the second memory 704, the first database (i.e., Table 200) that indicates the assigned bulk IDs (e.g., the first, second, and the third bulk IDs) and country codes of the acquirers and issuers. The second processor 702 includes a transaction message translator (TMT) 710, a message processing module (MPM) 712, and a splitter module 714. The second processor 702 translates and processes the transaction messages by way of the TMT 710 and the MPM 712, respectively.

The TMT 710 translates transaction messages between various message formats. When the payment network server 106 receives an inbound transaction message (for example, the first, second, or third inbound transaction message), the TMT 710 identifies a bulk ID included in the inbound transaction message. Based on the identified bulk ID, the TMT 710 queries the first database stored in the second memory 704 to identify a message format of the inbound transaction message. When the TMT 710 identifies that the message format is different from the third message format supported by the payment network, the TMT 710 translates the inbound transaction message to the third message format by invoking a specific JAR file (as described in FIGS. 3A, 3B, 4A, and 4B). The TMT 710, further, generates and inserts a destination identifier (such as the first or second destination identifier) in an outbound transaction message having the third message format, as described in FIGS. 3A, 3B, 5A, and 5B. Based on the inserted destination identifier, the TMT 710 translates the outbound transaction message from the third message format to a message format supported by an issuer corresponding to the outbound transaction message as described in FIGS. 3A, 3B, 5A, and 5B. The MPM 712 processes inbound transaction messages (e.g., the first, second, or third inbound transaction message) based on service indicators included in the inbound transaction messages and generates corresponding outbound transaction messages as described in FIGS. 3A, 3B, 4A, 4B, and 5A, and 5B.

The splitter module 714 facilitates segregation of an outbound transaction message to multiple outbound transaction messages. In one scenario, the payment network server 106 receives, from an acquirer server (say the first acquirer server 102), an inbound transaction message for batch processing of a batch of transactions. After the inbound transaction message is processed and an outbound transaction message is generated by the MPM 712, the splitter module 714 splits the generated outbound transaction message into a set of outbound transaction messages, such that each outbound transaction message in the set of outbound transaction messages corresponds to a different issuer. After the splitter module 714 has generated the set of outbound transaction messages, each outbound transaction message in the set of outbound transaction messages is processed by the TMT 710 for translation if required.

The second memory 704 includes suitable logic, circuitry, and/or interfaces for storing the first database (i.e., Table 200). The first database, as described in the foregoing description of FIG. 2, stores the list of bulk IDs assigned to the issuers and acquirers (such as the first, second, and third acquirers and the first issuer), message formats supported by the issuers and acquirers, country codes of the issuers and acquirers, service indicators for the functions provided by the payment network, or the like. The second memory 704 further stores JAR files 716 (such as the first, second, and third JAR files of FIGS. 3A, 3B, 4A, 4B, 5A, and 5B) linked to the service indicators. Examples of the second memory 704 include a RAM, a ROM, an HDD, a flash memory, a solid-state memory, and the like. It will be apparent to a person skilled in the art that the scope of the invention is not limited to realizing the second memory 704 in the payment network server 106, as described herein. In another embodiment, the second memory 704 may be realized in form of a database server or a cloud storage working in conjunction with the payment network server 106, without departing from the scope of the invention.

The second transceiver 706 transmits and receives data over the communication network 110 using one or more communication network protocols. The second transceiver 706 transmits various transaction messages between various acquirer servers (such as the first, second, and third acquirer servers 102, 104, and 502) and the issuer server 108. Examples of the second transceiver 706 include, but are not limited to, an antenna, a radio frequency transceiver, a wireless transceiver, a Bluetooth transceiver, an ethernet port, a USB port, or any other device configured to transmit and receive data.

Figure 8A:
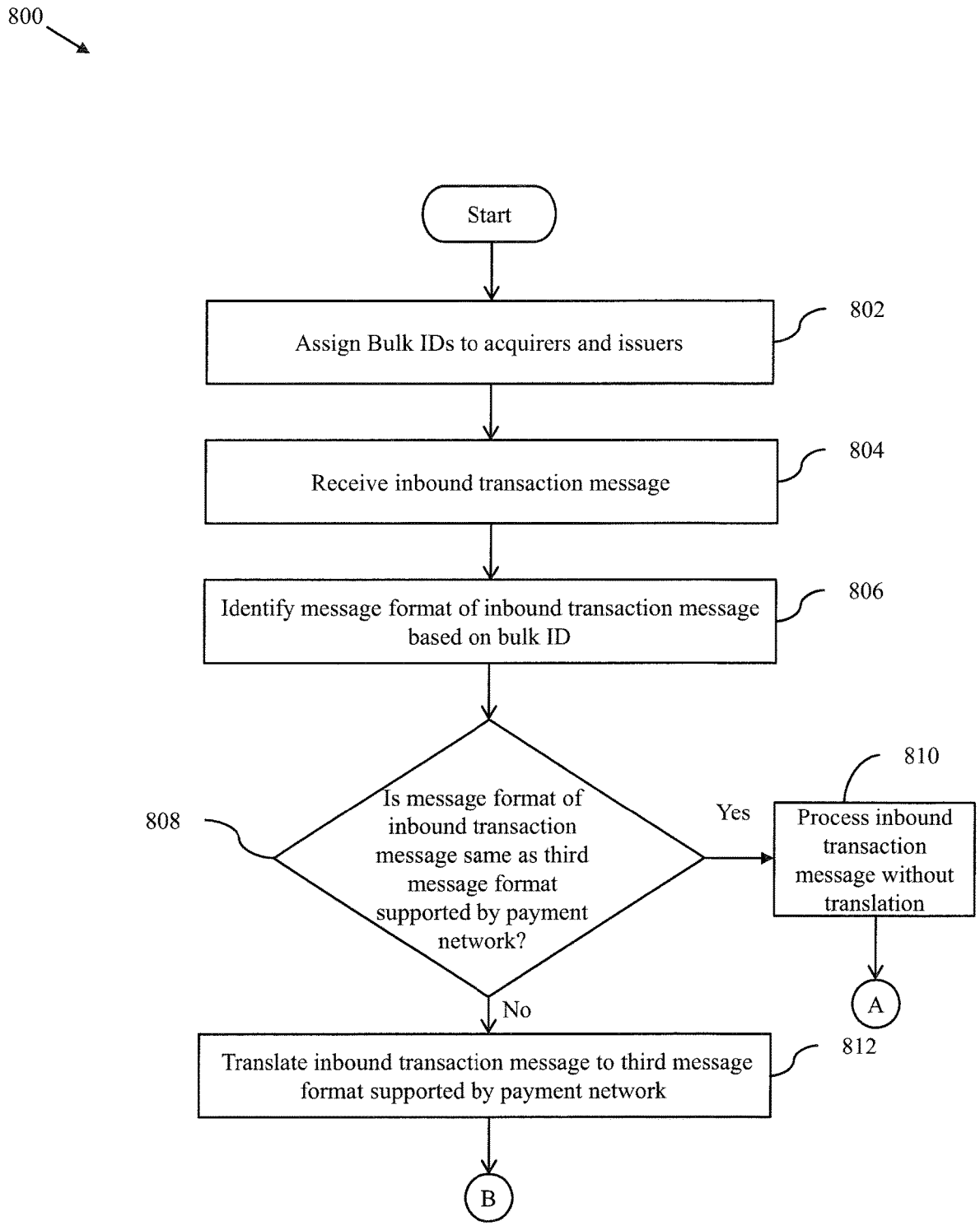
FIGS. 8A, 8B, and 8C, collectively represent a flow chart that illustrates a method translating transaction messages for processing transactions, in accordance with an embodiment of the present invention.
Figure 8B:
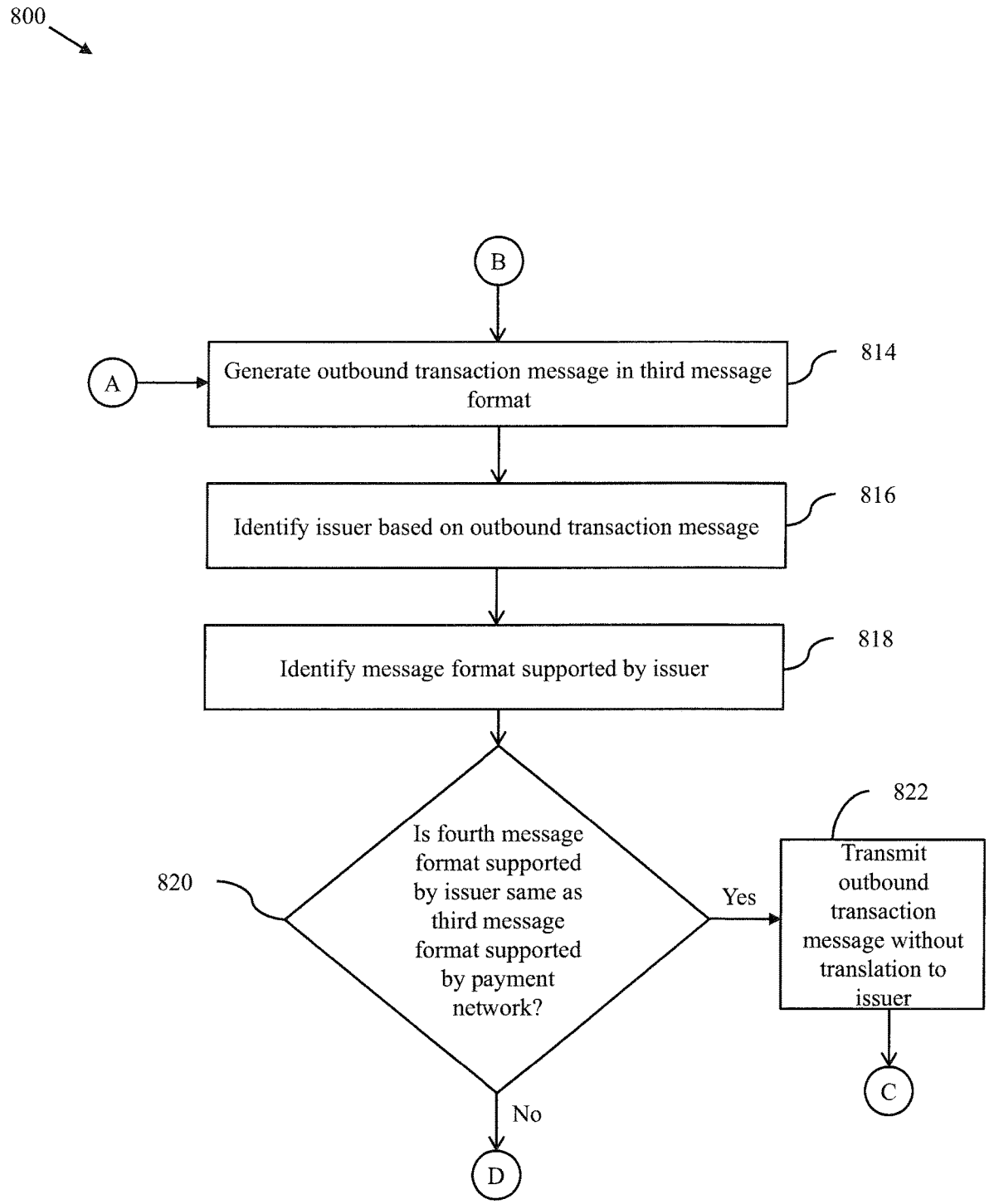
Figure 8C:
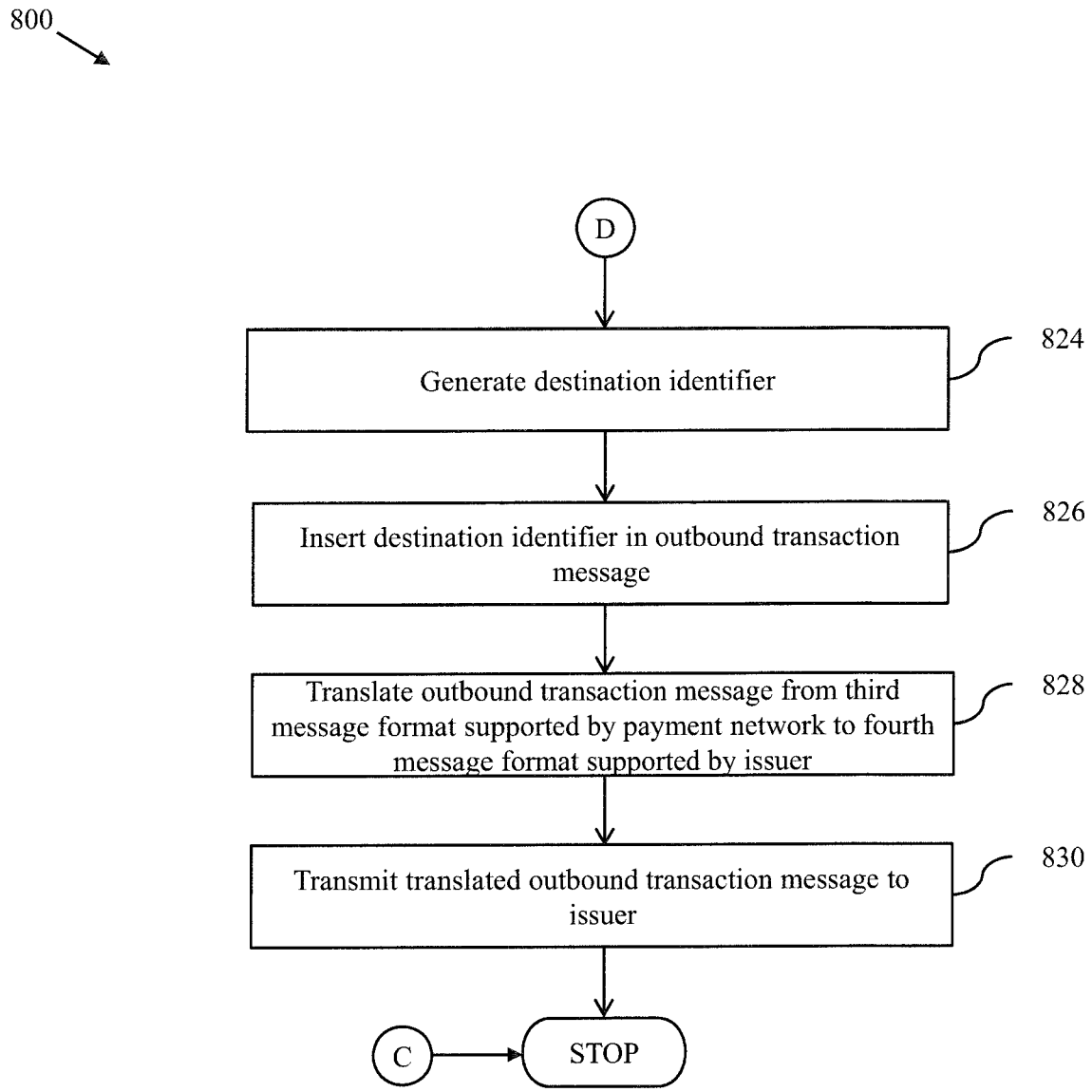

FIGS. 8A, 8B, and 8C, collectively represent a flow chart 800 that illustrates a method for translating transaction messages for processing transactions, in accordance with an embodiment of the present invention. At step 802, the payment network server 106 assigns the bulk IDs to the acquirers and issuers as described in FIG. 2. The assignment of the bulk IDs is based on the geographical locations and the message formats supported by the acquirers and issuers. For the sake of simplicity, and without limiting the scope of the invention, the flowchart 800 has been described in regards to the first acquirer server 102. The first acquirer server 102 generates and transmits the first inbound transaction message having the first message format to the payment network server 106. The first inbound transaction message includes the first bulk ID and the service indicator indicating that the first inbound transaction message pertains to authorization of the first transaction.

At step 804, the payment network server 106 receives the first inbound transaction message from the first acquirer server 102. At step 806, the payment network server 106 identifies a message format (i.e., the first message format) of the first inbound transaction message based on the first bulk ID included in the first inbound transaction message. At step 808, the payment network server 106 checks whether the message format of the first inbound transaction message is same as the third message format supported by the payment network server 106. If at step 808, it is determined that the message format of the first inbound transaction message is same as the third message format, step 810 is performed. At step 810, the payment network server 106 processes the first inbound transaction message without translation. If at step 808, it is determined that the message format of the first inbound transaction message is different from the third message format, step 812 is performed. At step 812, the payment network server 106 translates the first inbound transaction message from the first message format to the third message format supported by the payment network server 106, as described in the foregoing description of FIGS. 3A and 3B.

At step 814, the payment network server 106 generates the first outbound transaction message pursuant to the third message format by processing the first inbound transaction message. At step 816, the payment network server 106 identifies an issuer (i.e., the first issuer) corresponding to the first transaction based on the first outbound transaction message having the third message format. At step 818, the payment network server 106 identifies a message format supported by the first issuer by referring to the information stored in the first database.

At step 820, the payment network server 106 determines whether the message format supported by the first issuer is same as the third message format supported by the payment network. If at step 820, it is determined that the first issuer supports the third message format, step 822 is performed. At step 822, the payment network server 106 transmits the first outbound transaction message without translation to the issuer server 108. If at step 820, it is determined that the message format supported by the first issuer is different from the third message format supported by the payment network, step 824 is performed. At step 824, the payment network server 106 generates a destination identifier by referring to the first database. At step 826, the payment network server 106 inserts the destination identifier in the first outbound transaction message. At step 828, the payment network server 106 translates the first outbound transaction message from the third message format to the message format supported by the first issuer. At step 830, the payment network server 106 transmits the translated first outbound transaction message to the issuer server 108.

Figure 9:
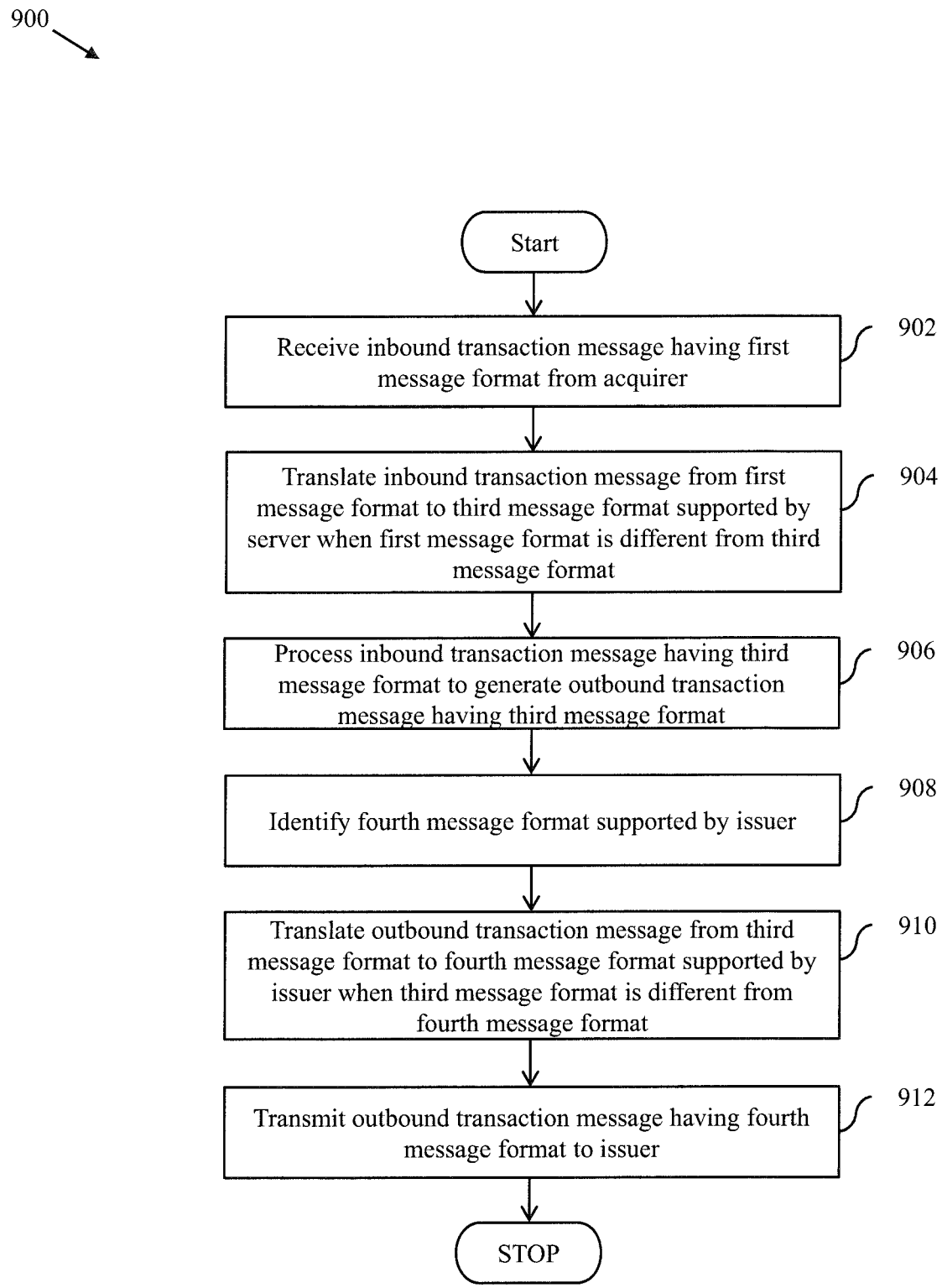
FIG. 9 represents a high-level flow chart that illustrates a method for translating transaction messages for processing transactions, in accordance with an embodiment of the present invention.

FIG. 9 represents a high-level flow chart 900 that illustrates a method for translating transaction messages for processing transactions, in accordance with an embodiment of the present invention. At step 902, the payment network server 106 receives the first inbound transaction message having the first message format from the first acquirer server 102. At step 904, the payment network server 106 translates the first inbound transaction message from the first message format to the third message format when the first message format is different from the third message format. At step 906, the payment network server 106 processes the first inbound transaction message having the third message format to generate the first outbound transaction message having the third message format. At step 908, the payment network server 106 identifies the fourth message format supported by the first issuer corresponding to the first transaction, based on the first outbound transaction message having the third message format. At step 910, the payment network server 106 translates the first outbound transaction message from the third message format to the fourth message format when the fourth message format is different from the third message format. At step 912, the payment network server 106 transmits the first outbound transaction message having the fourth message format to the issuer server 108. The issuer server 108 processes the first transaction based on the outbound transaction message having the fourth message format.

Thus, the environment 100 allows payment networks (such as the payment network associated with the payment network server 106) to translate transaction messages between various message formats. So, functions performed by third-party vendors can be performed by the payment networks. The third-party vendors can be excluded from translating transaction messages, thereby mitigating the security risks posed by the third-party vendors. Further, the exclusion of third-party vendors may improve processing time for processing the transaction messages. The method and system of the present invention allow the payment networks to achieve increased business by offering the translation service (as described in FIGS. 3A, 3B, 4A, 4B, 5A, and 5B) to financial institutions that use local message formats for transaction messages, thereby improving revenues and market capitalizations of the payment networks.

Figure 10:
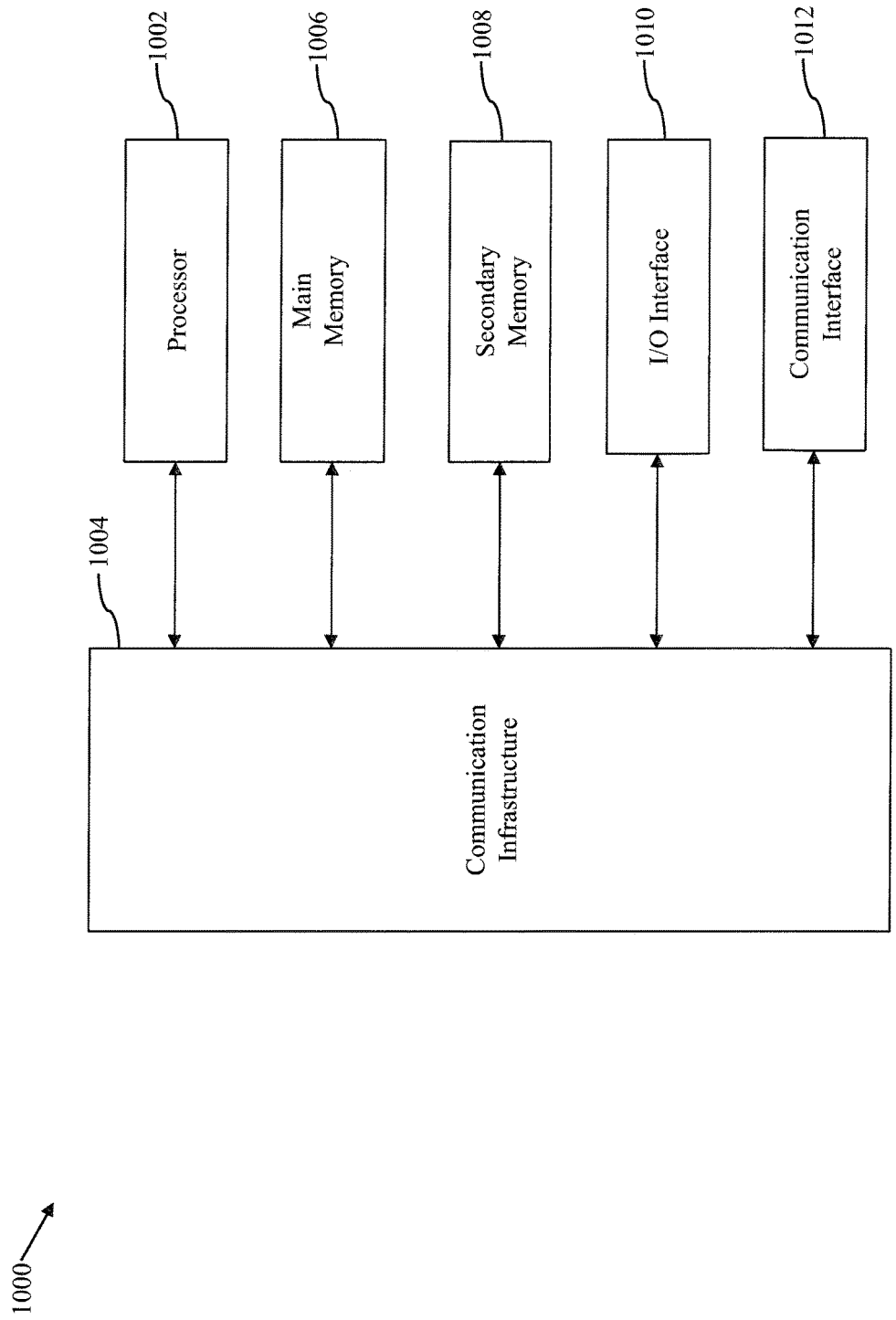
FIG. 10 is a block diagram that illustrates system architecture of a computer system, in accordance with an embodiment of the present invention.

FIG. 10 is a block diagram that illustrates system architecture of a computer system 1000, in accordance with an embodiment of the present invention. An embodiment of present invention, or portions thereof, may be implemented as computer readable code on the computer system 1000. In one example, the first acquirer server 102, the second acquirer server 104, the payment network server 106, the issuer server 108, and the third acquirer server 502 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 8A, 8B, 8C, and 9.

The computer system 1000 includes a processor 1002 that may be a special-purpose or a general-purpose processing device. The processor 1002 may be a single processor, multiple processors, or combinations thereof. The processor 1002 may have one or more processor cores. In one example, the processor 1002 is an octa-core processor. Further, the processor 1002 may be connected to a communication infrastructure 1004, such as a bus, message queue, multi-core message-passing scheme, and the like. The computer system 1000 may further include a main memory 1006 and a secondary memory 1008. Examples of the main memory 1006 may include RAM, ROM, and the like. The secondary memory 1008 may include a hard disk drive or a removable storage drive, such as a floppy disk drive, a magnetic tape drive, a compact disc, an optical disk drive, a flash memory, and the like. Further, the removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 1000 further includes an input/output (I/O) interface 1010 and a communication interface 1012. The I/O interface 1010 includes various input and output devices that are configured to communicate with the processor 1002. Examples of the input devices may include a keyboard, a mouse, a joystick, a touchscreen, a microphone, and the like. Examples of the output devices may include a display screen, a speaker, headphones, and the like. The communication interface 1012 may be configured to allow data to be transferred between the computer system 1000 and various devices that are communicatively coupled to the computer system 1000. Examples of the communication interface 1012 may include a modem, a network interface, i.e., an Ethernet card, a communication port, and the like. Data transferred via the communication interface 1012 may correspond to signals, such as electronic, electromagnetic, optical, or other signals as will be apparent to a person skilled in the art. The signals may travel via a communication channel (not shown) which may be configured to transmit the signals to devices that are communicatively coupled to the computer system 1000. Examples of the communication channel may include, but are not limited to, cable, fiber optics, a phone line, a cellular phone link, a radio frequency link, and the like.

Computer program medium and computer usable medium may refer to memories, such as the main memory 1006 and the secondary memory 1008, which may be a semiconductor memory such as a DRAM. These computer program mediums may provide data that enables the computer system 1000 to implement the methods illustrated in FIGS. 8A, 8B, 8C, and 9. In an embodiment, the present invention is implemented using a computer implemented application, the computer implemented application may be stored in a computer program product and loaded into the computer system 1000 using the removable storage drive or the hard disc drive in the secondary memory 1008, the I/O interface 1010, or the communication interface 1012.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 1002 and a memory such as the main memory 1006 and the secondary memory 1008 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present invention provide, among other features, systems and methods for translating transaction messages for processing transactions. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for translating transaction messages for processing transactions, the method comprising:
    transmitting one or more messages to each acquirer of a plurality of acquirers, by one or more servers of a payment network, to assign bulk identifiers (IDs) to each acquirer based on a geographical location and a message format associated with each acquirer;
    receiving, by the one or more servers of the payment network from a first acquirer of the plurality of acquirers, an inbound transaction message for a transaction, wherein the inbound transaction message is pursuant to a first message format supported by the first acquirer, wherein the inbound transaction message comprises a bulk ID assigned to the first acquirer;
    translating, by the one or more servers of the payment network, the inbound transaction message from the first message format to a second message format supported by the server, in response to the first message format being different from the second message format, wherein the first message format is identified based, at least partially, on the bulk ID assigned to the first acquirer;
    processing, by the one or more servers of the payment network, the inbound transaction message having the second message format to generate an outbound transaction message pursuant to the second message format;
    identifying, by the one or more servers of the payment network from a plurality of message formats, a third message format supported by an issuer that corresponds to the transaction, based on the outbound transaction message having the second message format;
    translating, by the one or more servers of the payment network, the outbound transaction message from the second message format to the third message format, in response to the third message format being different from the second message format;
    transmitting, by the one or more servers of the payment network, the outbound transaction message having the third message format to the issuer, wherein the issuer processes the transaction based on the outbound transaction message having the third message format; and
    facilitating an exchange of funds for the transaction between the first acquirer and the issuer.

2. The method of claim 1, further comprising assigning, by the one or more servers, a bulk identifier to each acquirer of the plurality of acquirers based on a geographical location and a message format associated with each acquirer, wherein the inbound transaction message received from the first acquirer includes the bulk identifier assigned to the first acquirer.

3. The method of claim 1, wherein the one or more servers process the inbound transaction message having the second message format for one of authorization, clearing, or settlement.

4. The method of claim 1, further comprising validating, by the one or more servers, the inbound transaction message having the second message format, wherein the one or more servers process the inbound transaction message having the second message format based on the validation.

5. The method of claim 1, further comprising:
    identifying, by the one or more servers, the issuer that corresponds to the transaction based on the outbound transaction message having the second message format; and
    generating, by the one or more servers, a destination identifier for the outbound transaction message having the second message format, wherein the destination identifier is indicative of the issuer and a geographical location of the issuer.

6. The method of claim 5, further comprising inserting, by the one or more servers, the destination identifier in the outbound transaction message having the second message format, wherein the one or more servers identify the third message format using the destination identifier.

7. The method of claim 1, wherein the third message format is different from the first message format.

8. The method of claim 1, wherein the third message format is same as the first message format.

9. The method of claim 1, wherein the inbound transaction message includes a service indicator, details of the first acquirer, details of the issuer, and a transaction amount of the transaction, and wherein the one or more servers the inbound transaction message having the second message format based on the service indicator.

10. The method of claim 9, wherein the outbound transaction message includes the details of the first acquirer, the details of the issuer, and the transaction amount.

11. A system for translating transaction messages for processing transactions, the system comprising:
    one or more payment network servers are configured to:
        transmit one or more messages to each acquirer of a plurality of acquirers to assign bulk identifiers (IDs) to each acquirer based on a geographical location and a message format associated with each acquirer;
        receive, from a first acquirer of the plurality of acquirers, an inbound transaction message for a transaction, wherein the inbound transaction message is pursuant to a first message format supported by the first acquirer, wherein the inbound transaction message comprises a bulk ID assigned to the first acquirer,
        translate the inbound transaction message from the first message format to a second message format supported by the payment network server, in response to the first message format being different from the second message format, wherein the first message format is identified based, at least partially, on the bulk ID assigned to the first acquirer,
        process the inbound transaction message having the second message format to generate an outbound transaction message pursuant to the second message format, identify, from a plurality of message formats, a third message format supported by an issuer that corresponds to the transaction, based on the outbound transaction message having the second message format, translate the outbound transaction message from the second message format to the third message format, in response to the third message format being different from the second message format, transmit the outbound transaction message having the third message format to the issuer, wherein the issuer processes the transaction based on the outbound transaction message having the third message format; and facilitate an exchange of funds for the transaction between the first acquirer and the issuer.

12. The system of claim 11, wherein the one or more payment network servers are further configured to assign a bulk identifier to each acquirer of the plurality of acquirers based on a geographical location and a message format associated with each acquirer, and wherein the inbound transaction message received from the first acquirer includes the bulk identifier assigned to the first acquirer.

13. The system of claim 11, wherein the one or more payment network servers process the inbound transaction message having the second message format for one of authorization, clearing, or settlement.

14. The system of claim 11, wherein the one or more payment network servers are further configured to validate the inbound transaction message having the second message format, and wherein the payment network server processes the inbound transaction message having the second message format based on the validation.

15. The system of claim 11, wherein the one or more payment network servers are further configured to:

identify the issuer that corresponds to the transaction based on the outbound transaction message having the second message format, and generate a destination identifier for the outbound transaction message having the second message format, wherein the destination identifier is indicative of the issuer and a geographical location of the issuer.

16. The system of claim 15, wherein the one or more payment network servers are further configured to insert the destination identifier in the outbound transaction message having the second message format, and wherein the payment network server identifies the third message format using the destination identifier.

17. The system of claim 11, wherein the third message format is different from the first message format.

18. The system of claim 11, wherein the third message format is same as the first message format.

19. The system of claim 11, wherein the inbound transaction message includes a service indicator, details of the first acquirer, details of the issuer, and a transaction amount of the transaction, and wherein the payment network server processes the inbound transaction message having the second message format based on the service indicator.

20. The system of claim 19, wherein the outbound transaction message includes the details of the first acquirer, the details of the issuer, and the transaction amount.

* * * * *